United States Patent [19]

Davis et al.

[11] 3,839,705

[45] Oct. 1, 1974

[54] DATA PROCESSOR INCLUDING MICROPROGRAM CONTROL MEANS

[75] Inventors: Richard K. Davis, Roanoke, Va.; James W. Conley, Scotia, N.Y.

[73] Assignee: General Electric Company, Salem, Va.

[22] Filed: Dec. 14, 1972

[21] Appl. No.: 315,155

[52] U.S. Cl. .......... 340/172.5
[51] Int. Cl. .......... G06f 9/16
[58] Field of Search .......... 235/151.1; 340/172.5

[56] References Cited

UNITED STATES PATENTS

| | | | |
|---|---|---|---|
| 3,475,732 | 10/1969 | Avsan et al. | 340/172.5 |
| 3,560,933 | 2/1971 | Schwartz | 340/172.5 |
| 3,634,883 | 1/1972 | Kreidermacher | 340/172.5 |
| 3,636,522 | 1/1972 | Buschmann et al. | 340/172.5 |
| 3,646,522 | 2/1972 | Furman et al. | 340/172.5 |
| 3,707,703 | 12/1972 | Sakai | 340/172.5 |

*Primary Examiner*—Gareth D. Shaw
*Assistant Examiner*—Michael Sachs
*Attorney, Agent, or Firm*—Robert E. Brunson; Arnold E. Renner; Harold H. Green, Jr.

[57] ABSTRACT

A data processor includes a microprogram controller having first and second memories and associated logic for selectively providing control signals for the processor for controlling the execution of instructions therein in accordance with microprogram information stored in the memories.

7 Claims, 15 Drawing Figures

BASIC INSTRUCTION WORD FORMAT IN STORE

BRANCH CONTROL WORD FORMAT IN MPROM

PROCEDURE CONTROL WORD FORMAT IN MPROM

I/O CONTROL WORD FORMAT IN MPROM

INSTRUCTION CONTROL WORD FORMAT IN MDROM

| TEST # | BIT TEST FIELD 8 | 9 | 10 | 11 | MNEUMONIC | DESCRIPTION |
|---|---|---|---|---|---|---|
| 0 | 0 | 0 | 0 | 0 | ——— | NOT USED |
| 1 | 0 | 0 | 0 | 1 | ——— | NOT USED |
| 2 | 0 | 0 | 1 | 0 | ——— | NOT USED |
| 3 | 0 | 0 | 1 | 1 | ——— | NOT USED |
| 4 | 0 | 1 | 0 | 0 | XB | INSTRUCTION BASED ? |
| 5 | 0 | 1 | 0 | 1 | ——— | NOT USED |
| 6 | 0 | 1 | 1 | 0 | XA | INSTRUCTION INDEXED ? |
| 7 | 0 | 1 | 1 | 1 | ——— | NOT USED |
| 8 | 1 | 0 | 0 | 0 | FTCH | OPERAND FETCH ? |
| 9 | 1 | 0 | 0 | 1 | ——— | NOT USED |
| 10 | 1 | 0 | 1 | 0 | ——— | NOT USED |
| 11 | 1 | 0 | 1 | 1 | BST | BRANCH ON STATUS CONDITION TRUE |
| 12 | 1 | 1 | 0 | 0 | ——— | NOT USED |
| 13 | 1 | 1 | 0 | 1 | SRC | SHIFT RIGHT COMPLETE ? |
| 14 | 1 | 1 | 1 | 0 | ——— | NOT USED |
| 15 | 1 | 1 | 1 | 1 | UB | UNCONDITIONAL BRANCH |

BRANCH CONTROL WORD BIT TEST FIELD DECODE

DATA PROCESSOR INCLUDING MICROPROGRAM CONTROL MEANS

BACKGROUND OF THE INVENTION

This invention relates generally to data processors and more particularly to memory controllers for controlling the operation of data processors.

FIELD OF THE INVENTION

Data processors, in general, utilize logic elements interconnected in a prescribed configuration to generate signals for controlling the execution of instructions by the processors in response to operation signals derived from the instructions.

DESCRIPTION OF THE PRIOR ART

It is well-known by those skilled in the art, that a great deal of the logic which makes up a data processor is used for controlling the execution of instructions by the processor. This control is normally effected by a complex design of many discrete logic elements or integrated circuits interconnected to selectively generate control signals for the processor in response to instruction word information provided from the data processor memory.

One obvious disadvantage in this type of control logic design is the complexity and the expense manifested by the use of many logic elements. Further, this type of design is not universally adaptable for use in various types of data processors. That is, for each new data processor design, a new control logic design must be specifically tailor-made for the data processor.

Because of these disadvantages, the most recent trend has been to design data processors utilizing a single read only memory having a stored microprogram for controlling the execution of instructions by the processor. Typically, the microprogram consists of a plurality of control words arranged in a prescribed configuration whereby the microprogram is executed through a plurality of subroutines. Each subroutine is associated with an associated instruction to be executed by the data processor. As a result, either a large read only memory or several memories are required to retain all of the control words for each of the data processor instructions. A design of this type results in a cost savings when compared to the discrete logic element design; however, it is still an expensive approach because of the need for a large read only memory.

In order to reduce the size and the cost of the read only memories, engineers have also designed processor controllers using supplementary control logic with the memory. In this type of design, the read only memory contains fewer microprogram subroutines, wherein each subroutine may partially control the execution of several instructions having common instruction execution characteristics. However, there comes a point during the execution of these several instructions, where they no longer share common characteristics. That is, they each perform a different function in the data processor. It is at this point that the need for the supplementary control logic arises, so that the necessary control signals, unique to each of the several instructions, can be generated for controlling the data processor.

Each of the previously described designs offers certain tradeoff cost advantages dependent upon the number and complexity of the instructions a data processor can execute. However, as previously pointed out, when a processor controller is designed using discrete logic elements, it necessitates a unique design for each processor.

In view of the above disadvantages, it is desirable to provide a universally adaptable new and improved controller for a data processor which reduces the amount of control logic required by providing a plurality of memories containing descriptive microprogram and microdecoding information for controlling the execution of instructions by a data processor.

SUMMARY OF THE INVENTION

The present invention largely overcomes these problems of the prior art by providing a microprogram controller for any one of several types of external devices, such as a data processor, wherein the controller is comprised of first and second memories and a minimum of associated control logic for controlling the execution of instructions in the data processor. The first memory, which is referred to as a microprogram memory, contains indicia or information items in the form of microprogram control words or instructions comprising a microprogram. The control words have several formats for controlling the operation of the controller and for controlling the execution of various types of instructions by the data processor.

The first microprogram memory has associated control logic which permits sequential addressing and the selective addressing of the memory to itself and from the second memory in response to control word information items provided by the first memory and to various status conditions and operation code signals provided to the control logic by the data processor.

The second memory of the controller may be referred to as a micro-decode or supplemental memory. This latter memory contains a plurality of addressable storage locations wherein each of the storage locations contains an instruction control word or indicia unique to each instruction to be executed by the data processor. The micro-decode memory may communicate directly with the data processor store or with a data processing unit in the data processor to receive operation code information. The operation code information is utilized by the micro-decode memory to selectively address the latter to effect the reading or retrieval therefrom of instruction control words unique to the operation code information. During the execution of certain instructions by the data processor, the micro-decode memory, under control of the contents of the microprogram memory, provides address information to the latter memory to effect branch addresses therein to specified starting locations unique to particular microprogram subroutines which are executed by the controller.

Both memories of the microprogram controller provide information items or output signals to a transfer means or control multiplexer. The control multiplexer selectively provides control and data signals to the data processor from both of the memories in accordance with the instruction being executed by the processor and in accordance with a microprogram control word being retrieved from the microprogram memory.

It is the operation of the multiplexer in conjunction with both of the memories which eliminates the majority of supplemental logic normally required and reduces the amount of memory storage space for storing the microprogram.

This elimination of the supplemental logic and the reduction in storage space is effected first by providing a microprogram, in the microprogram memory, comprised of a plurality of subroutines. Each subroutine is associated with a plurality of data processor instructions which have common instruction execution characteristics. During the execution of a particular subroutine by the controller, a point is reached in the microprogram where the common characteristics of the particular data processor instruction being executed does not exist. Under control of specified information items in the microprogram control words of the subroutine, the controller is forced to defer control of the execution of the data processor instruction from the microprogram memory of the micro-decode memory. This deference of control is effected by providing specified information items or control signals to the multiplexer from the microprogram memory. These control signals allow the multiplexer to selectively generate specified output signals to cause the data processor to perform those functions which are unique to the individual instruction being executed. Certain microprogram control words, when retrieved from the microprogram memory, direct the multiplexer to provide the control signals for the data processor from both of the memories.

As will be seen, the dual memory concept illustrated by the controller of the present invention offers the important advantage of being able to economically design a user device controller having a minimum number of logic elements. Further, since the invention is a programmable controller, it may be custom programmed to control any type of data processor, digital controller, or external device, thus eliminating the need to design a new controller.

It is, therefore, an object of the present invention to provide a microprogram controller having enhanced operating capabilities for controlling an external device.

Another object is to provide a universally adaptable microprogram controller which may be programmed with control words to form a microprogram for controlling the execution of instructions in a data processor.

Still another object is to provide a controller for a data processor having a microprogram memory and a micro-decode memory wherein the microprogram memory contains a microprogram for controlling a portion of the execution of selected instructions by the processor and wherein the micro-decode memory contains information unique to the selected instructions to control another portion of the execution of the instructions.

Another object is to provide a microprogram controller having dual memories for controlling a data processor wherein one of the memories is addressed directly by the data processor to generate information items unique to an instruction to be executed by the processor and wherein the other memory is selectively addressable from either memory to effect the sequencing of a microprogram by the controller in accordance with the instruction to be executed.

A still further object is to provide a microprogram controller of the preceding character having a multiplexer for selectively providing control and data signals for the data processor for controlling the execution of instructions thereby.

An additional object is to provide a microprogram controller of the preceding type having associated control logic which communicates with the data processor to effect the transfer of an address from one memory to the other memory in response to the operation code signals and status signals provided to the control logic from the processor and to information items or signals from the latter memory.

The foregoing and other objects will become apparent as this description proceeds and the features of novelty which characterize the invention will be pointed out in particularity in the claims and annexed to and forming a part of this specification.

BRIEF DESCRIPTION OF THE DRAWING

The present invention may be more readily described and understood by reference to the accompanying drawing in which.

DESCRIPTION OF THE PREFERRED EMBODIMENT

Figure 1:
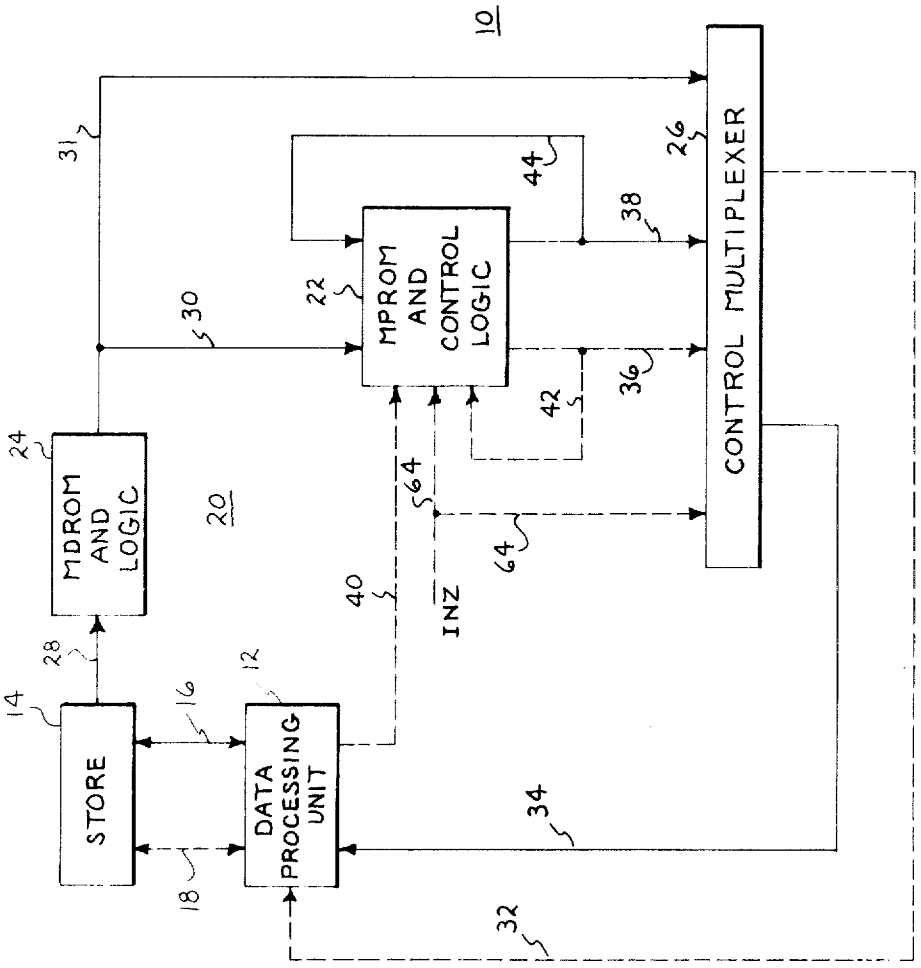
FIG. 1 is a major block diagram of a data processor incorporating a microprogram controller in accordance with the present invention wherein the solid lines represent data or information signal lines and the dashed lines represent control signal lines.

Reference is now made to FIG. 1 which shows a data processor generally designated 10. The data processor 10 includes a data processing unit 12 which may be any one of several types of general purpose digital computers or controllers. However, for purposes of describing the operation of the invention, the processing unit 12 is considered to be of the well-known type having an instruction address register, a K-register or counter, an arithmetic logic unit, an A-register and suitable control or gating logic for controlling register operations and the flow of information within an external to the processing unit.

The instruction address register (hereafter called the IAR) is controllable to receive information from the arithmetic logic unit and from the control or gating logic. Also, the IAR is controllable to serve as a memory address register (MAR) for writing or storing information to and retrieving or reading information from a store or main memory 14 forming a part of the data processor 10. Further, the contents of the IAR can be written into the store 14 or loaded from the store to and from address locations specified by either the IAR or the gating logic within the processing unit 12.

The K-register serves as a counter to count the number of shifts performed by the processing unit 12 during the execution of shift type instructions. Additionally, the K-register is controllable to be loaded from either the store or the arithmetic logic unit. Dependent upon the type of instruction being executed by the data processor, the contents of the K-register are representative of instruction address or shift count information.

The arithmetic logic unit (subsequently referred to as the ALU) contains logic making it selectively controllable to receive information from the IAR and K-register to perform arithmetic operations and register to register transfers.

The A-register is basically an arithmetic register. It is controllable to be shifted a number of bit positions during the execution of shift instructions by the data processor. Also, the A-register is controllable to communicate with the store 14 during store read and write operations. Thus, its contents may be stored into or loaded from specified store locations. The output of the ALU is also gated into the A-register during the execution of certain data processor instructions. Information transfer between the data processing unit 12 and the store 14 is via a plurality of data line 16. This information transfer is effected by control signals which flow between the store and the processing unit over a plurality of control lines 18.

A microprogram controller generally designated 20 is made up of a microprogram read only memory (MPROM) and control logic 22 and a micro-decode read only memory (MDROM) and logic 24. Also, the controller 20 contains a control multiplexer 26. The micro-decode read only memory 24 (hereinafter referred to as MDROM) communicates directly with the data processor store 14 via data lines 28 to receive operation code information items of instruction words from the store as address information.

Figure 2:
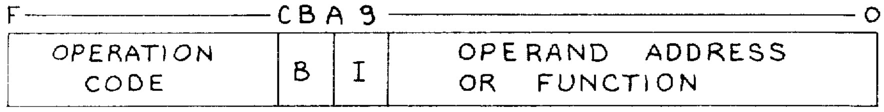
FIG. 2 illustrates the basic instruction word format of instruction words as retained in the data processor store.

The instruction word format of FIG. 2 is exemplary of the instructions contained in the store 14 for each instruction to be executed by the data processor 10. Bits A through F of the instruction words are provided to the MDROM via operation code or address lines 28, when an instruction is extracted from the store by the data processing unit 12. Bits C through F define the instruction, such as add, subtract, etc. Bit B is used to signify that the instruction address field (bits 0–9) is to be index base addressed and bit A is used to specify that the instruction address field is to be indexed. Base addressing and indexing of an instruction word address field can be specified simultaneously with bits A and B. The operation code information (bits A-F) is retained in a holding means or register within the MDROM wherein the information is utilized to address specific addressable storage locations in the MDROM. Each of these storage locations contains an instruction control word unique to each instruction to be executed by the data processor. The significance of each of the bits within the instruction control word of FIG. 4 will subsequently be described.

When the MDROM is addressed, it provides indicia or signals to to MPROM 22 and to the control multiplexer 26. The data signals are provided to the MPROM from the MDROM as address bits or signals on a multiconductor cable 30 for addressing specified locations within the MPROM. Certain specified ones of the indicia are provided to the control multiplexer 26 from the MDROM 24 via conductors 31 wherein the multiplexer selectively provides control and data signals to the data processing unit 12 via a plurality of control and data signal lines 32 and 24 respectively. The control multiplexer also receives information items in the form of control and data signals from the MPROM via control and data lines 36 and 38 respectively. These latter signals are combined in the multiplexer with the indicia from the MDROM to generate the output signals from the multiplexer on conductors 32 and 34.

Reference is now made to the MPROM and control logic 22 of FIG. 1. The MPROM has a plurality of selectively addressable storage locations, wherein each location contains a particular microprogram control word. These microprogram control words collectively comprise a microprogram to be executed by the controller 10 to effect an orderly generation of the output signals from the multiplexer 26 on conductors 32 and 34 for each instruction to be executed by the data processor 10.

Figure 3A:
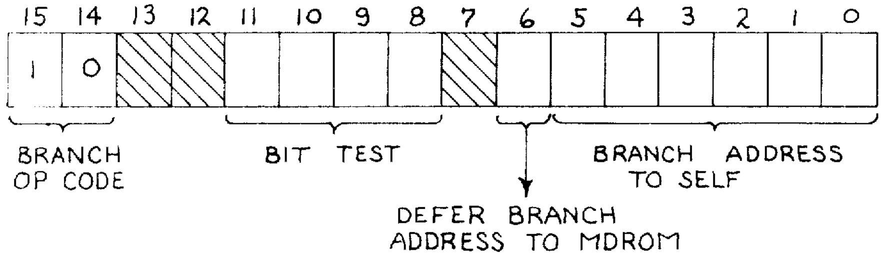
FIGS. 3A through 3C illustrate the format of the several types of microprogram control words as retained in the microprogram memory.
Figure 3B:
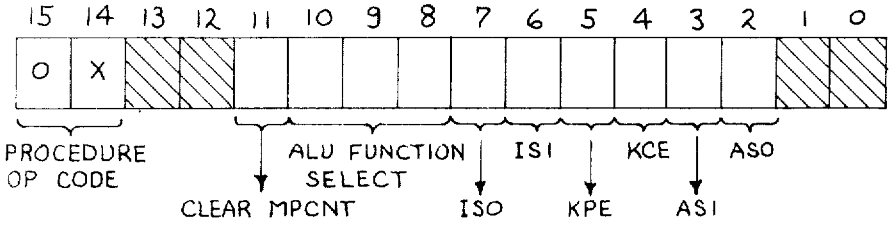
Figure 3C:
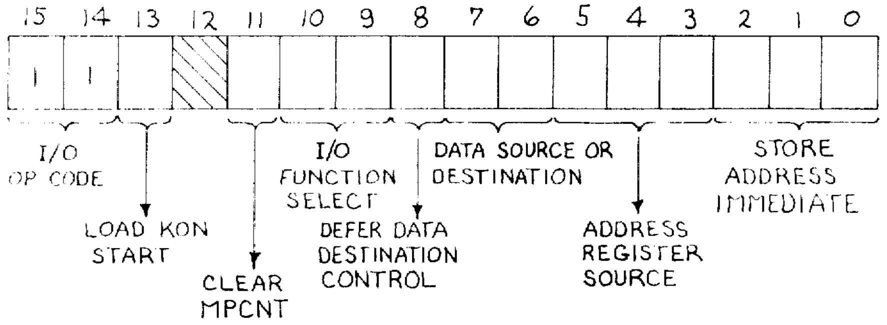

Prior to proceeding further with the description of the microprogram controller 10 of the instant invention, it is considered advantageous to describe the various control words contained in the MPROM. These control words are shown in FIGS. 3A, 3B and 3C. FIG. 3A illustrates the format of a branch control word. This latter word is used during the execution of the microprogram to effect the selective addressing of the MPROM based on the contents of the branch control word and various status conditions or signals provided to the MPROM from the processing unit 12 via status lines 40.

Figures 6, 7A:
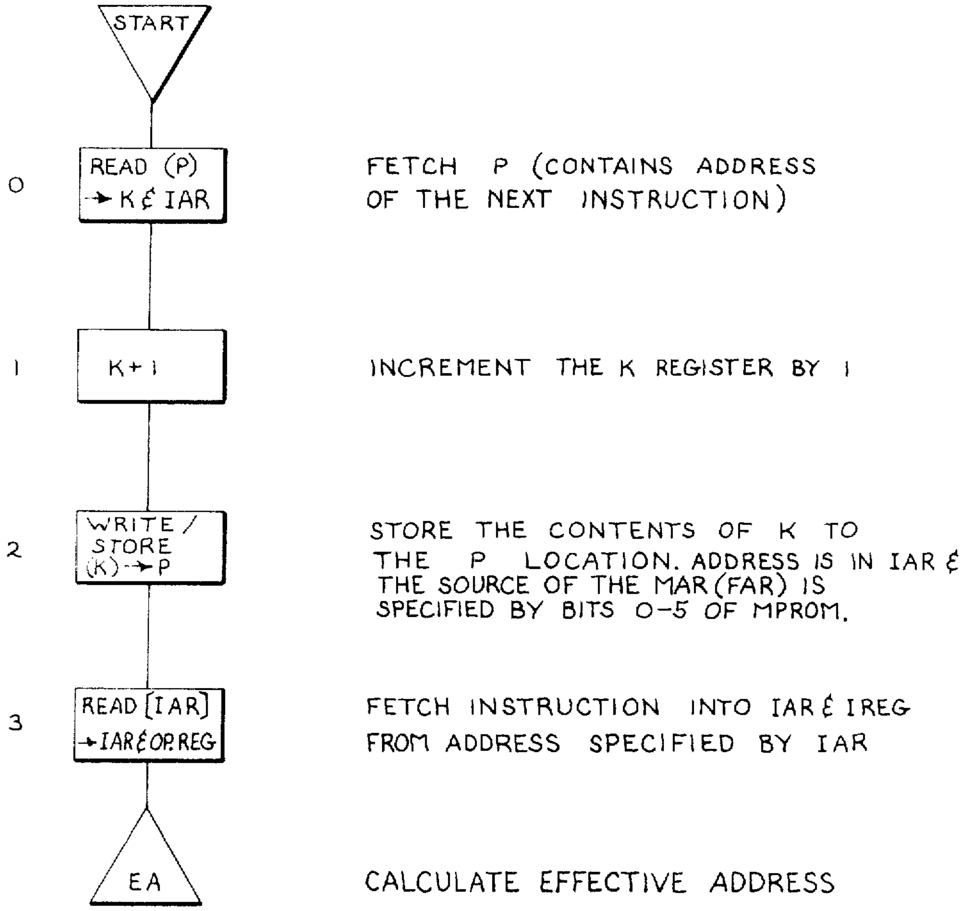
FIG. 6 is a table showing the decoding of information items in a particular field of bits in the control word of FIG. 3A.
FIGS. 7A through 7C and FIGS. 8 through 11 collectively are flow charts showing the microprogram and subroutine sequencing of the microprogram controller for controlling the execution of instructions by the data processor.

Bits 14 and 15 (FIG. 3A) are the operation code (op. code), and are provided as op. code signals from the output of the MPROM to the MPROM control logic on conductors 42 (FIG. 1). The control logic decodes these op. code signals to allow the execution of the branch control word by the controller 10. A bit test field, comprised of bits 8 through 11, also provides branch test signals via lines 42 to the MPROM control logic. These branch test signals are compared against the status signals from the processing unit to effect the generation of either a branch or sequential address to the MPROM. The coding of the bit test field for specified branch test to be performed by the controller is shown in FIG. 6. The significance of the various branch tests will subsequently be described.

A branch address to self field of the branch control word is comprised of bits 0 through 5. These bits are provided as address signals from the output of the MPROM back to the input via address lines 44 (FIG. 1). It will be recalled that the MPROM can be selectively addressed. This selective addressing is controlled by the state of a bit 6 of the branch control word. Bit 6 is used to provide a defer address signal, via lines 42, to the MPROM control logic to determine whether the next address from the MPROM is to come from itself (bits 0–5) or from the MDROM via address lines 30. This latter address comes from bits 18 through 23 of the instruction control word of FIG. 4, the format of which will be described later.

Bits 7, 12 and 13 of the branch control word of FIG. 3A are shown hashed out, indicating that they are not used. However, they may have use for the performance of extended functions in the controller, not defined herein.

Another of the control word formats which may be contained in the various memory locations of the MPROM is a procedure control word as shown in FIG. 3B. Procedure control words are utilized to generate output signals from the control multiplexer 26 to control the manipulation of data within the data processing unit 12. Like the branch control word, the procedure control word contains a procedure op. code in bits 14 and 15. These bits are also provided to the MPROM control logic via lines 42 to control the execution of this particular control word by the microprogram. Additionally, bits 14 and 15 are provided to the multiplexer 26 via lines 36 for controlling the multiplexing of control and data signals to the processing unit 12. The procedure control word also contains an ALU function select field comprised of bits 8, 9 and 10. These bits are provided as function select signals to the control multiplexer 26 which in turn provides specified output control signals via lines 32 to the data processing unit to control the operating functions of the ALU. For example, these control signals may enable the ALU to increment information provided thereto by one or to effect the addition of a plurality of input signals provided to the ALU. Bits 2 through 7 of FIG. 3B also provide specified control functions or signals to the control multiplexer on lines 36. These control functions are designated as AS0, AS1, KCE, KPE, IS1, IS0, corresponding to bits 2 through 7 respectively. These signals AS0 and AS1 are provided as outputs from the control multiplexer to the processing unit for controlling various operations of the A-register. Signals KCE and KPE are similarly provided from the multiplexer to the processing unit for controlling the operations of the K-register. Likewise, signals IS1 and IS0 are provided as input signals to the instruction address register (IAR) for controlling its operations. The utilization of these signals will subsequently be described. One additional bit, bit 11, designated clear MPCNT, is utilized by the MPROM control logic to reset the MPROM address to a specified location for addressing the latter. Bits 0, 1, 12 and 13 of FIG. 3B are also unused as explained for FIG. 3A.

The last type of word format contained within the MPROM is shown in FIG. 3C and is identified as an input/output (I/O) control word. This word is used during the execution of the microprogram for controlling transfers of information between the data processing unit 12 and the store 14. These transfers may be a read of information from the store or a write of information to the latter. The I/O control word contains an I/O op. code in bits 14 and 15 which is used in the MPROM control logic in a manner similar to that described in connection with FIG. 3B.

Bits 0 through 5 of FIG. 3C collectively comprise a store address source for specifying to the processing unit 12 the source from which it is to address the store 14. For purposes of explanation, bits 0 through 5 are pointed into two fields. Bits 0, 1 and 2 are defined as a store immediate address field. During the execution of certain instructions, where it is desirable to index modify the address of the instruction being executed, bits 0 through 2 may be coded in a particular bit configuration to cause the store 12 to be addressed, via the processing unit, directly from the multiplexer 26. In effect, this coding of bits 0 through 2 causes the reading of an address indexing or modifier word to the K-register from a store location specified by bits 0 through 2 for subsequent addition to the IAR to index modify the instruction word. During the execution of certain other instructions however, it is desirable to address the store from some other source. In this latter case, bits 3 through 5 (address register source field) are coded to cause the multiplexer to select either the IAR as the memory address register (MAR) or to defer the address register source to that specified by bits 10 through 15 to the MDROM instruction control word (FIG. 4).

Bit 13 of the I/O control word provides a signal to the multiplexer 26 on lines 36 to cause the multiplexer to provide a load K-register signal to the processing unit via one of the lines 32 during startup of the data processor 10. When the load K-register signal is generated, the K-register is loaded from a store location specified by the contents of bits 0 through 2, the store address immediate field.

An I/O function select field is comprised of bits 9 and 10 (FIG. 3C) and are coded to cause the multiplexer to provide signals to the processing unit to cause the latter to generate either a read or write operation to the store 14. A data source or destination field (bits 6 and 7) of the I/O control word are decoded by the multiplexer to provide either a data source or destination signal to the processing unit to establish the source of data to store within the processing unit on a write or the destination of data from store on a read. The I/O control word FIG. 3 also contains a defer destination control field, bit 8, which is utilized by the multiplexer to allow control of the destination of the transfer of data from and to the store to be deferred from bits 6 and 7 of the MPROM I/O control word to bit 17 of the MDROM instruction control word. Bit 11 (Clear MPCNT) is utilized in the I/O control word in the same manner as described for bit 11 in connection with FIG. 3B.

Figure 4:
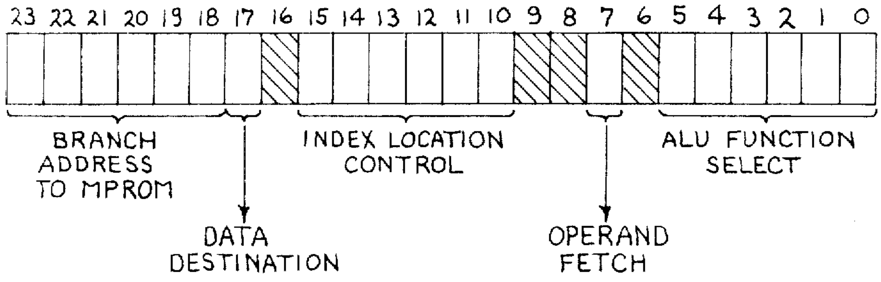
FIG. 4 illustrates the format of the instruction control words contained in the micro-decode memory.

Reference is now made to FIG. 4 which shows the format of the instruction control words contained in the MDROM. Each of the various addressable storage locations in the MDROM contains a control word having contents unique to an instruction to be executed by the data processor. As previously mentioned, the MPROM contains the microprogram for controlling the basic execution of instructions by the data processor. This microprogram is supplemented by the instruction control words in the MDROM. The instruction control word contains a branch address to MPROM field in bits 18 through 23. During the execution of certain branch control words in the microprogram, it is desirable to defer the branch address of the microprogram to the address specified by this field. This address, therefore, causes the microprogram to branch to a specified location in the MPROM to effect the execution of a microprogram subroutine for controlling the execution of a particular data processor instruction in accordance with the operation code address information provided to the MDROM from the store. Also, as previously explained, during the execution of an I/O control word, it may be desirable to defer control of the data destination or source of information to the MDROM. When this occurs, a data destination bit 17, is utilized to control the transfer of information between the store and either the A or the K-register.

The purpose of the index location control, bits 10 through 15, was briefly described in connection with the use of the I/O control word in FIG. 3C. It will be recalled that, the address register source field, (bits 3, 4 and 5 in FIG. 3C) may be coded to specify that the store address is to be taken directly from the MDROM instruction control word. When bits 3, 4 and 5 of FIG. 3C are coded to specify this addressing, bits 10 through 15 of FIG. 4 are utilized by the multiplexer to directly address a specified index location in the store via the data processing unit.

A bit 17 of FIG. 4, designated operand fetch, is utilized by the MPROM control logic to control the addressing of the MPROM to a specified location during the execution of data processor instructions requiring that an operand be fetched from the store 14. The instruction control word also contains an ALU function select field (bits 0 through 5) similar to that as previously described in connection with FIG. 3B. This field (FIG. 4) is used by the control multiplexer to provide many of the same output control signals to the data processing unit as described in connection with FIG. 3B. However, in addition to those control signals previously described, it also allows an extention of the capacity of the ALU function select field in FIG. 3B. That is, additional functions may be performed under control of the MDROM instruction control word not possible under control of the procedure control word in FIG. 3B. It will be recalled, that the ALU function select field of FIG. 3B may be coded to defer control of the ALU to bits 0 through 5 of the ALU function select field of the MDROM.

Figure 5:
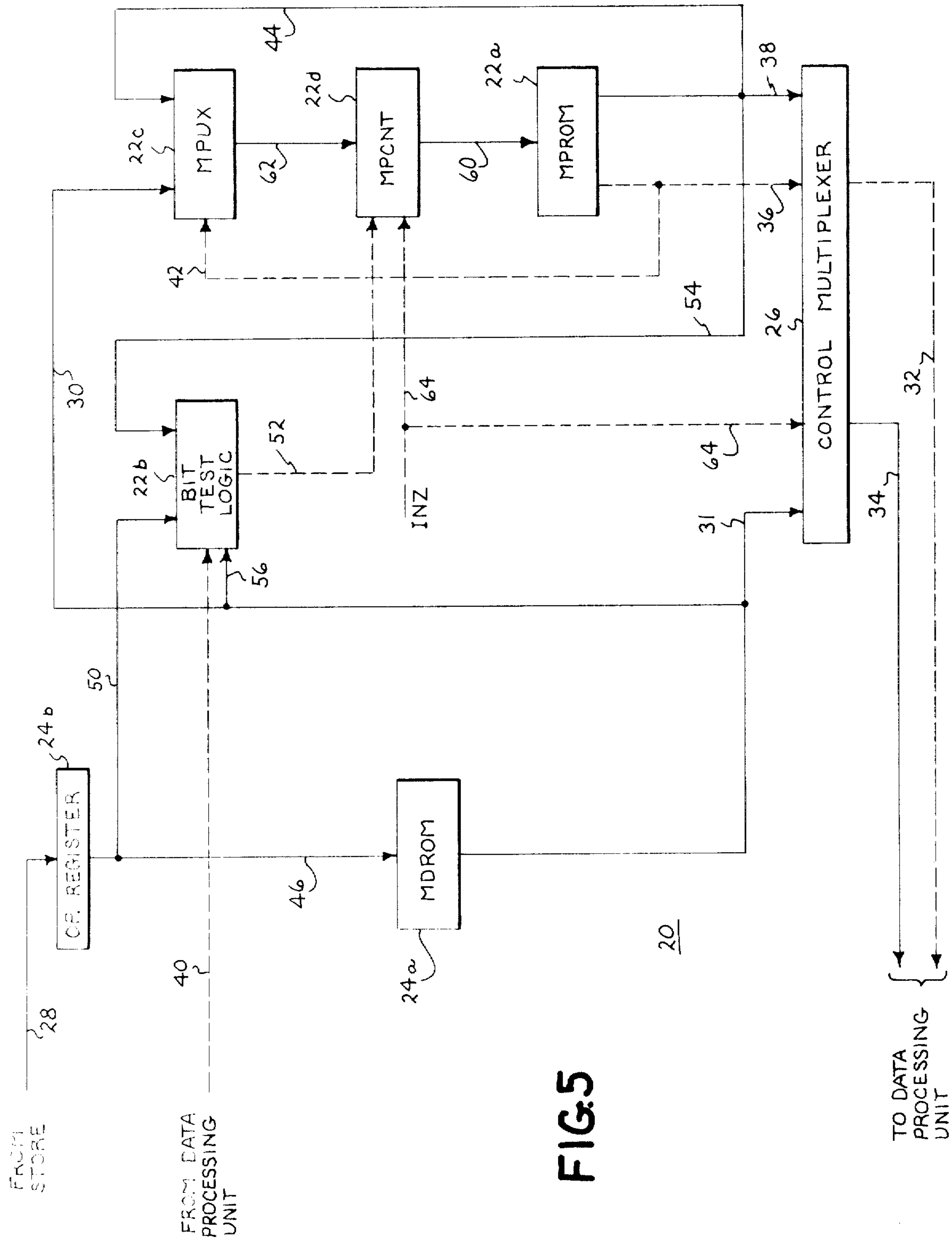
FIG. 5 is a block diagram of the microprogram controller in accordance with the present invention, wherein the solid and dashed lines carry the same representation as described for FIG. 1.

Reference is now made to FIG. 5 which shows in more detail a block diagram of the microprogram controller 20 of FIG. 1. The MPROM and control logic 22 of FIG. 1 is comprised of a microprogram read only memory (MPROM) 22*a*, a bit test logic block 22*b*, a microprogram multiplexer block (MPUX) 22*c* and a microprogram counter block (MPCNT) 22*d*. The MDROM and logic 24 of FIG. 1 is comprised of a micro-decode read only memory (MDROM) 24*a* and an operation code register (op. register) 24*b*. The op. register receives the operation code information of instructions retrieved from the store via lines 28. Address and operation code signals from the register 24*b* are provided to the MDROM 24*a* via a plurality of address lines 46 and to the bit test logic 22*b* via a plurality of op. code lines 50. Suitable address decode logic within the MDROM decodes the output signals from the register 24*b* for selectively addressing various storage locations in the MDROM during the execution of instructions by the data processor. The bit test logic 22*b* provides control signals, via a plurality of conductors 52 to the MPCNT 22*d* for controlling the latter in accordance with the instructions being executed by the data processor and further in accordance with information items provided thereto from the MPROM on lines 54. In addition, the control signals from the bit test logic are also controlled by status signals or conditions from the processing unit 12 on lines 40 and instruction control word signals from the MDROM on lines 56.

The MPCNT is basically a serial count, parallel load type of counter having input control logic for controlling its operation in accordance with the control signals provided thereto. During the execution of certain instructions by the data processor, control signals from the bit test logic 22*b* will cause the MPCNT to sequentially count to provide sequential addressing signals to the input of the MPROM via a plurality of address lines 60. The MPROM, which includes suitable address decode logic similar to the MDROM, will decode the addressing signals to selectively read the contents of the addressed storage locations. During the execution of certain other instructions, the control signals provided to the MPCNT 22d from the bit test logic 22b will allow a selected address to be parallel loaded into the MPCNT from the output of the MPUX 22*c* via a plurality of address conductors 62.

The MPUX 22*c* receives address information from the MDROM via address lines 30 and from the output of the MPROM 44 on conductors 44. As previously mentioned, the state of bit 6 of the branch control word of FIG. 3A determines whether the MPROM address is to come from the MDROM or the MPROM. This determination is made in the MPUX which receives a signal representative of the state of bit 6 on control lines 42 to allow the designated address to pass to the MPCNT.

Each of the logic blocks MPROM (22*a*), Bit Test Logic (22*b*), MPUX (22*c*), MPCNT (22*d*), MDROM (24*a*), OP Register (24*b*) and the Control Multiplexer (26) may be formed from standard integrated circuits available from manufacturers of such circuitry. Each of the circuits for implementing the logic functions in the above blocks is shown and described in "The Integrated Circuits Catalog For Design Engineers," by Texas Instruments Incorporated, First Edition, publication number CC-401, 10072-41-US. The circuits used in these blocks are identified in that book as follows:

1. The MPROM (22*a*) and the MDROM (24*a*) are each 256 Bit Read Only Memories, Type SN 7488. These circuits are also manufactured by Signetics and are shown and described in "Signetic Digital 8000 Series TTL/MSI Manual," publication number D253DIG-002-11-50M, copyright 1971, as Type 8223.
2. The MPUX (22*c*) and the Control Multiplexer (26) are comprised of Quad 2-input multiplexer logic circuitry, Type SN 74157. These circuits are also shown and described in the Signetics reference in (1.) above as Type 93S157.
3. The MPCNT (22*d*) is a synchronous 4-bit counter, Type SN 74161.
4. The OP Register (24*b*) is a Type SN 74175.
5. The Bit Test Logic (22*b*) is comprised of a Type SN 74150 circuit.

By referencing the above tabulated circuit descriptions in the two cited references one can readily ascertain how the various logic blocks may be interconnected to form the invention structure of FIG. 5.

The following two tables represent a microprogram listing showing the bit pattern of the instructions in each of the memory locations in the MPROM and the MDROM. Table I is a listing of the MPROM microprogram and Table II is a listing of the MDROM. These tables are useful in understanding the invention and should be referred to during the ensuing operational description of the invention. The word formats of FIGS. 3A, 3B and 3C match the corresponding formats of the words in the MPROM of Table I. Similarly, the word format of FIG. 4 match the format of the words in the MDROM of Table II. It will also be noted that each of the words in Table II (MDROM) is addressable by the OP code of an instruction having the format of FIG. 2, wherein the word corresponds or is associated with the particular instruction (e.g. the OP code for the instruction STA addresses location 0 of the MDROM). The X's shown in each of the tables means that that particular bit is not used or the logic recognizes the state of that bit as an "I don't care" item.

representative of the address now in the MPCNT, appear at the input of the MPROM via address lines 60.

Figure 9:
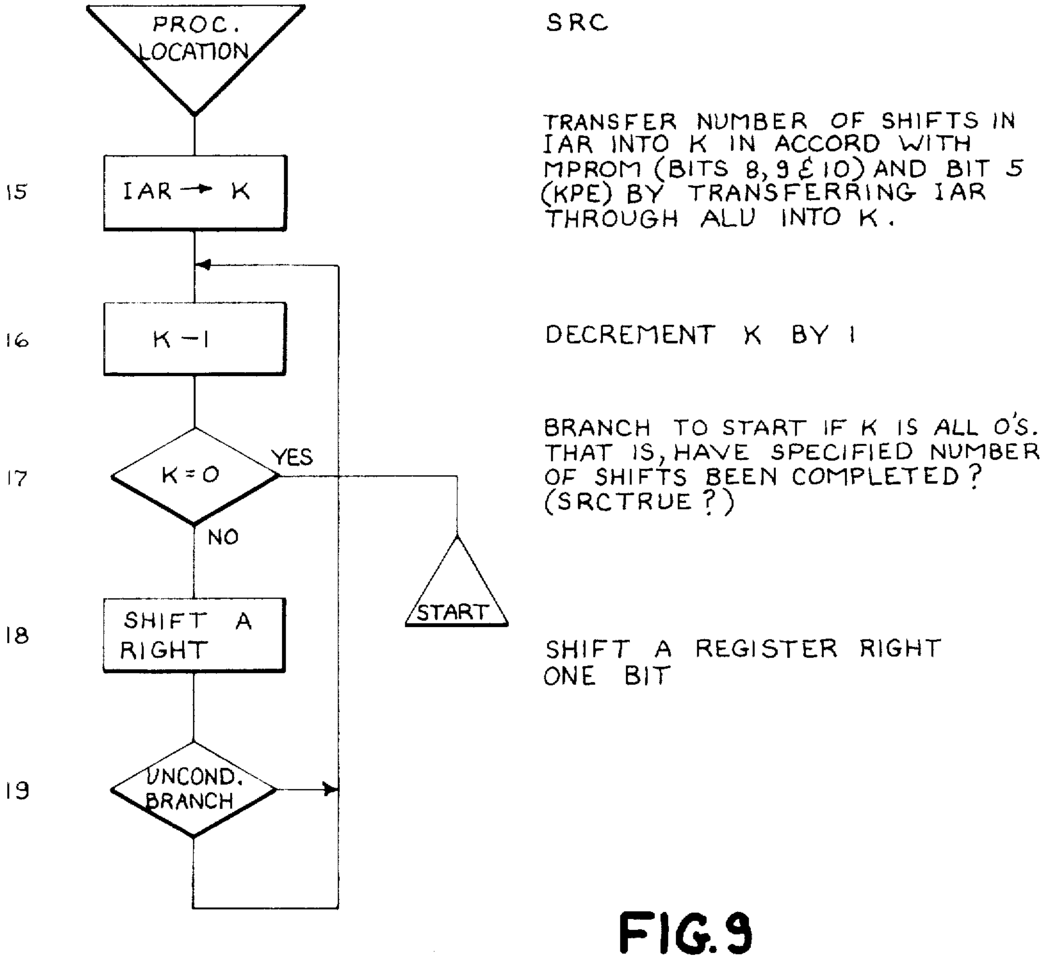
Figure 10:
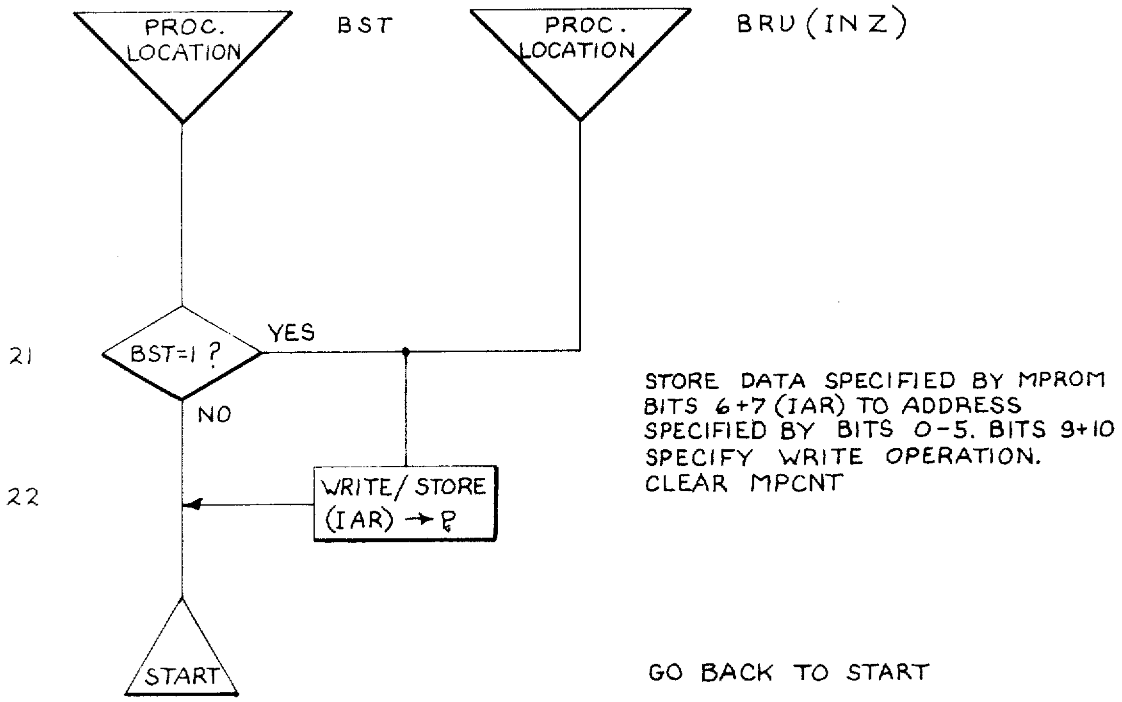

Reference is now made to a number 22 appearing on the left side of FIG. 10. This number, and all similarly located numbers in FIGS. 7A through 7C and FIGS. 9 through 11, designates the memory address location or

TABLE I

MPROM LISTING

| ADDRESS (Location) | BITS 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | 1 | 1 | 1 | X | 0 | 1 | 0 | 0 | 0 | 0 | 0 | 1 | 1 | 0 | 0 | 0 |
| 1 | 0 | X | X | X | 0 | 0 | 0 | 0 | 0 | 0 | 1 | 0 | 0 | 0 | X | X |
| 2 | 1 | 1 | 0 | X | 0 | 0 | 0 | 0 | 1 | 1 | X | X | X | X | X | X |
| 3 | 1 | 1 | 0 | X | 0 | 1 | 0 | 0 | 1 | 0 | 0 | 0 | 0 | X | X | X |
| 4 | 1 | 0 | X | X | 0 | 0 | 1 | 0 | X | 0 | 0 | 0 | 0 | 1 | 1 | 1 |
| 5 | 1 | 1 | 0 | X | 0 | 1 | 0 | 0 | 1 | 1 | 0 | 0 | 1 | 0 | 1 | 0 |
| 6 | 0 | X | X | X | 0 | 1 | 0 | 1 | 1 | 1 | 0 | 0 | 0 | 0 | X | X |
| 7 | 1 | 0 | X | X | 0 | 1 | 1 | 0 | X | 0 | 0 | 0 | 1 | 0 | 1 | 0 |
| 8 | 1 | 1 | 0 | X | 0 | 1 | 0 | 0 | 1 | 1 | 0 | 1 | 0 | 1 | 0 | 1 |
| 9 | 0 | X | X | X | 0 | 1 | 0 | 1 | 1 | 1 | 0 | 0 | 0 | 0 | X | X |
| 10 | 1 | 0 | X | X | 0 | 0 | 0 | 1 | X | 0 | 0 | 0 | 1 | 1 | 0 | 0 |
| 11 | 1 | 1 | 0 | X | 0 | 1 | 0 | 1 | 0 | 0 | 0 | 0 | 0 | X | X | X |
| 12 | 1 | 0 | X | X | 1 | 1 | 1 | 1 | X | 1 | X | X | X | X | X | X |
| 13 | 1 | 1 | 0 | X | 0 | 1 | 0 | 0 | 0 | 0 | 0 | 0 | 0 | X | X | X |
| 14 | 0 | X | X | X | 1 | 1 | 0 | 0 | 1 | 0 | 0 | 0 | 1 | 1 | X | X |
| 15 | 0 | X | X | X | 0 | 0 | 1 | 1 | 0 | 0 | 1 | 0 | 0 | 0 | X | X |
| 16 | 0 | X | X | X | 0 | 1 | 0 | 0 | 1 | 1 | 1 | 1 | 0 | 0 | X | X |
| 17 | 1 | 0 | X | X | 1 | 0 | 1 | 1 | X | 1 | 0 | 0 | 0 | 0 | 0 | 0 |
| 18 | 0 | X | X | X | 0 | X | X | X | 0 | 0 | 0 | 0 | 1 | 1 | X | X |
| 19 | 1 | 0 | X | X | 1 | 1 | 1 | 1 | X | 0 | 0 | 0 | 0 | 0 | 1 | 0 |
| 20 | 1 | 1 | 0 | X | 1 | 0 | 1 | 0 | 0 | 1 | 0 | 0 | 0 | X | X | X |
| 21 | 1 | 0 | X | X | 1 | 1 | 0 | 1 | X | 0 | 0 | 0 | 0 | 0 | 0 | 0 |
| 22 | 1 | 1 | 0 | X | 1 | 0 | 1 | 0 | 0 | 0 | 0 | 1 | 1 | 0 | 0 | 0 |

TABLE II

MDROM LISTING

| MNEMONIC (ADDRESS) | OP CODE | 0 1 2 3 4 5 6 7 8 9 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|
| STA | 0 | X X X X X X X 0 X X X | X | X | 1 | 0 | 1 | X | X | 0 | 0 | 1 | 0 | 1 | 0 |
| SUB | 1 | 1 0 0 1 1 1 X 0 X X 0 | 1 | 0 | 1 | 0 | 1 | X | X | 1 | 0 | 1 | 1 | 0 | 0 |
| ADD | 2 | 0 1 1 0 1 0 X 0 X X 0 | 1 | 0 | 1 | 0 | 1 | X | X | 1 | 0 | 1 | 1 | 0 | 0 |
| BRU | 3 | X X X X X X X 0 X X 1 | 0 | 0 | 0 | 0 | 1 | X | X | 0 | 1 | 1 | 0 | 1 | 0 |
| BST | 4 | X X X X X X X 0 X X 1 | 0 | 0 | 0 | 0 | 1 | X | X | 1 | 0 | 1 | 0 | 1 | 0 |
| SRC | 5 | 0 0 0 0 1 0 X 0 X X X | X | X | 1 | 0 | 1 | X | X | 1 | 1 | 1 | 1 | 0 | 0 |

The operation of the invention will now be explained by referring initially to FIGS. 1, 5 and 10. In order to start the microprogram controller at a proper microprogram step or address location in the MPROM and to insure that the data processing unit 12 addresses a starting location in the store 14, it is first necessary to initialize the data processor. This initilization is accomplished by the application of an initialization signal (INZ) on a line 64 to the control multiplexer 26 and to the MPCNT 22*d*. The generation of the INZ signal may be accomplished from a source not shown, such as the activation of an initialization or start switch on a console associated with the data processing unit. When the INZ signal is generated, basically two things take place simultaneously. First, the INZ signal causes the control multiplexer 26 to generate an output control signal via lines 34 which is applied to the data processing unit to force a hardware wired address into the IAR. The contents of IAR now contain the address of the first instruction to be executed by the data processing unit. The second operation to take place is to preset or parallel load a predetermined address into the MPCNT. When the INZ signal is removed, the address signals, microprogram step of the MPROM geing addressed by the MPCNT. It will also be noted that either a decision or operation block, accompanied by a description of what takes place in each block, appears immediately to the right of each address location number in each of the immediately preceding mentioned figures. Each of the blocks, such as the block corresponding to the location address 21 of FIG. 10, contains descriptive information related to operations which take place in either the controller or the processing unit during the execution of a particular microprogram step. These operations typically are effected by the controller based on the contents of the particular control words being retrieved from the MPROM and the MDROM during the execution of the microprogram.

Referring still to FIG. 10, the information contained in address location 22 is an I/O control word having the format as shown in FIG. 3C. With the addressing of the MPROM from the MPCNT, the I/O control word is read out or retrieved from the MPROM which provides I/O control word signals to the control multiplexer 26 via lines 36 and 38. As shown in the operation block adjacent location 22, the control multiplexer causes the data processing unit to store the contents of the IAR to a specified location in store designated the P-register (program register). The control multiplexer effects this store operation by decoding bits 0–10, and bits 14 and 15. As shown in FIG. 3C, bits 14 and 15, the I/O op. code, are both coded as binary ones. The control multiplexer decodes bits 14 and 15 in conjunction with the other bits in the I/O control word to generate the proper output control and data signals to the data processing unit. Bits 9 and 10 of the I/O function select field are decoded by the control multiplexer to enable the data processing unit to effect either a read or a write cycle to the store. In this instance, since it is desirable to write or store the contents of the IAR to location P in store, bits 9 and 10 are coded so that the multiplexer 26 generates an output signal on one of the lines 32 to effect a write cycle to the store by the data processing unit. Since it is not desirable at this time to defer the destination control of the MPROM to the MDROM, bit 8 is a binary 0. Also, the data source or destination field, bits 6 and 7, of the I/O control word are coded such that the control multiplexer sends a signal, via one of the lines 32 to cause the contents of the IAR to be written into location P. Also, bits 0–5 of the I/O control word are utilized to define or select the source of the memory address register for addressing the store. In this instance, the memory address register source comes directly from bits 0–2, which are coded so that the multiplexer ignores bits 3–5. The multiplexer 26, in response to the coding of bits 0–2, sends address or data signals on lines 34 to the gating logic in the processing unit to allow the contents of the IAR to be stored in location P of the store.

It will be noted in the notes corresponding to location 22 that the MPCNT is cleared. This operation is performed by referring to FIG. 3C wherein the clear MPCNT bit 11 is set to a binary 1. The states of bits 11, 14 and 15 are provided to the bit test logic **22*b* and decoded therein to effect the generation of a clear signal on conductors 52 to the MPCNT. The clear signal resets the MPCNT to zero, or some predetermined number, forcing the microprogram controller to go to a start condition as shown in a start block at the bottom of the flow chart of FIG. 10.**

Reference is now made to FIG. 7A, which shows a flow chart for the start of the microprogram. The MPCNT, which now contains a count of zero, provides output address signals on lines 60 (FIG. 5) to the MPROM addressing location zero as shown on the left side of FIG. 7A. Location zero in the MPROM also contains an I/O control word which effects the reading of the contents of location P in the store into the K-register and the IAR. The contents of location zero from the MPROM are now present at the input of the control multiplexer which decodes bits 14 and 15 as an I/O control word. During the execution of this I/O control word, since it is desirable to load the K-register, bit 13 is set to a binary one. In this particular instance, it is not desirable to clear the MPCNT, therefore, bit 11 is a binary zero. Since this is to be a read from store by the data processing unit, the I/O function select field (bits 9 and 10) are coded so that the control multiplexer effects a read operation of the store by the data processing unit. The defer destination control, bit 8, is a binary zero at this time because it is not desirable to defer control to the MDROM. Since it is also desirable to put the contents of P in the IAR, bits 6 and 7 are coded so that the multiplexer will direct the processing unit accordingly. Again, bits 0–5 are coded such that the control multiplexer provides a direct address to the processing unit as specified by bits 0–2 to address the store location of the P-register. Also, at this time, since the clear MPCNT bit 11 is a binary 0 the bit test logic **22*b*, in conjunction with bits 14 and 15 generates a count signal or pulse to the MPCNT. This count signal is applied to one of the lines 52** causing the MPCNT to increment by one, causing the latter to address location 1 of the MPROM as shown to the left of a K + 1 operation block of FIG. 7A.

The contents of location 1 of the MPROM are now retrieved and applied, via lines 36 and 38, to the multiplexer 26. During this step of the microprogram, it is desirable to increment the K-register by one in order to update the register. This is accomplished by a procedure control word (FIG. 3B) in location 1 of the MPROM. Bits 14 and 15, shown as an X and a zero respectively, are decoded by the control multiplexer in conjunction with other ones of the bits of the procedure control word to effect the proper output control signals for the data processing unit. Bit 14, containing the X, is used herein to signify that its contents are insignificant. During the execution of this microprogram step, it is not desirable to clear the MPCNT, therefore, bit 11 is a binary zero. In some data processing units, the incrementing of specified registers is effected by gating data through the ALU. When this is the situation, the ALU function select field bits 8–10 of FIG. 3B, may be coded and used by the multiplexer to generate output control signals to the ALU for this purpose. For example, to increment the K-register by one, it would first be necessary to code bits 8–10 to cause the multiplexer to provide an enable signal to the ALU to allow the contents of the K-register to enter the ALU. Also, it would be necessary to generate a carry-in signal to the ALU to allow an addition of one bit to the contents of the K-register passing through the ALU. This could also be provided by proper coding of bits 8–10. In addition, it would be necessary to take the contents of the ALU and place them back into the K-register. This would be accomplished by placing a binary 1 in bit 5 of the procedure control word. When bit 5 is a binary 1, the control multiplexer will generate an output signal KPE which allows the register to be parallel loading from the ALU.

However, should the data processing unit be the type where incrementing of specified registers is accomplished directly in the register itself, and not by passing the output of the registers through an ALU, the ALU function select field bits 8–10, may be coded to be ignored by the multiplexer. In this latter instance, the only control then necessary would be to place a binary 1 in bit 4 of the procedure control word to enable the multiplexer to generate a signal KCE to allow the K-register to count up by one. KCE designates K-register count enable.

Bits 14, 15 and 11 of the procedure control word are also provided as inputs to the test logic via lines 54. Since at this time it is not desirable to clear the MPCNT, bit 11 is a binary 0. Thus, the bit test logic generates a count output signal on one of the lines 52 to step the MPCNT to a count of 2. The number 2 on the left side of FIG. 7A represents address location 2 in the MPROM is now being addressed from the MPCNT. In this poriton of the microprogram it is desirable to store the contents of the K-register back to the P location in the store. This is accomplished by decoding the contents of an I/O control word (FIG. 3C) now being retrieved from location 2 of the MPROM. Again, the control multiplexer will decode bits 14 and 15 as an I/O control word. At this time, bits 11 and 13 will be binary 0's. Since the operation is to be a store of the contents of the K-register to the P-register in store, the I/O function select field bits 9 and 10 will be coded to cause the multiplexer to send a write operation control signal to the processing unit. Again, bit 8 will be a binary 0, since it is not desirable to defer control to the MDROM. The source of the data going into the store is to come from the K-register, therefore, bits 6 and 7 are coded accordingly to allow the control multiplexer to generate a control signal to the processing unit to provide a data path from the K-register to the addressed location in the store. Again, as previously described, the source of the memory address register is directly from bits 0–2 via the control multiplexer. The MPCNT is again incremented by one to a count of three by the bit test logic which responds to the states of bits 14, 15 and 11.

The IAR now contains the address of an instruction to be fetched from the store, wherein the instruction is a part of a program to be executed by the data processor. This instruction fetch is initiated in the microprogram by referring to address location 3 in FIG. 7A presently being addressed from the MPCNT. This is to be a fetch of a word from the store, therefore, the data contained in location 3 is an I/O control word. In this instance the data processing unit is to fetch an instruction into the IAR and into the op. register 24*b* (FIGS. 1 and 5) from the address location specified by the contents of the IAR. This operation is indicated in the block to the right of number 3, wherein the brackets [ ] around IAR indicate that the contents of the store location specified by IAR are to be loaded into the IAR. Also, the operation code portion (bits A-F) of the instruction word are placed in the op. register 24*b*. This is effected, as previously described, wherein the control multiplexer decodes the states of bits 14 and 15 in conjunction with bits 9 and 10, to effect a read store cycle by the data processing unit. The destination of the data to be read from the store must be specified. This is accomplished by the data source or destination field bits 6 and 7, having a specified coded configuration which is decoded by the control multiplexer to provide control signals to the processing unit causing the instruction word to be read into the IAR and op. register 24*b*. The source of the store address register is specified by bits 0–5 which are coded such that the multiplexer generates a signal to the processing unit to enable the address for the store to be generated from the IAR as specified by bits 3–5 (address register source field).

Bits 0–9 of the instruction to be executed by the data processor are now loaded into the IAR and bits A-F are loaded into the op. register 24*b* preparatory to calculating the effective address of the instruction now contained in the IAR, if so required (FIG. 2). This calculation of the effective address is shown in FIG. 7A where the controller exits from location 3 to an EA block (effective address). It is again desirable to increment MPCNT by 1. This is accomplished by the bit test logic which generates a count signal to the MPCNT in response to bits 14, 15 and 11 of the I/O control word causing the MPCNT to count up to four. Thus, the contents of the MPROM location 4 are retrieved for execution by the controller.

Figure 7B:
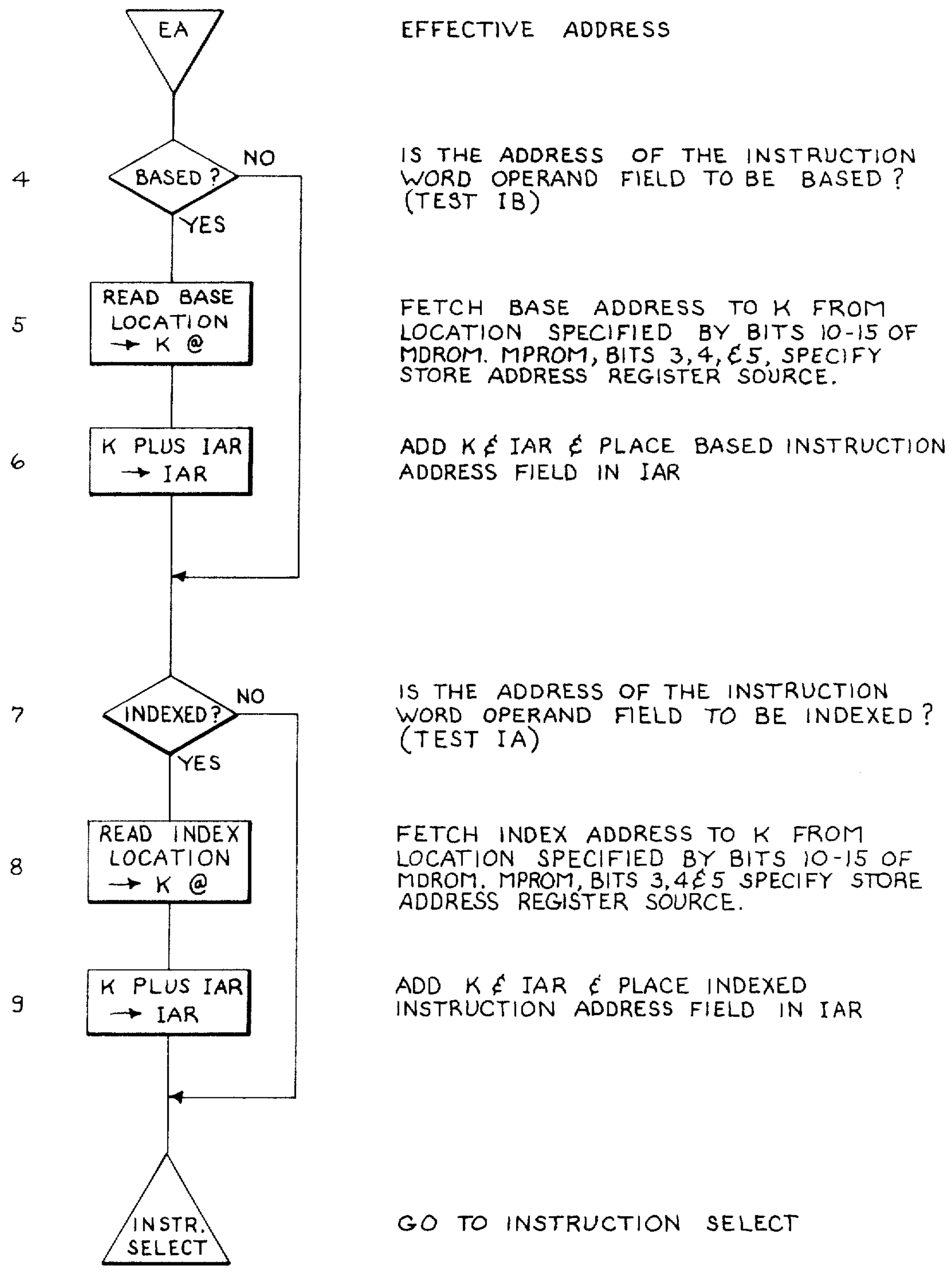

Reference is now made to FIG. 7B, wherein the microprogram controller steps into that portion of the microprogram wherein the effective address is calculated, if so specified by the operation code information in the op. register 24*b*.

The microprogram controller of the present invention calculates the effective address of instructions by the execution of specified microprogram control words which first determine whether an instruction word is to be modified by index basing, indexing or both. If the instruction word is to be modified, a sequence of microprogram control words are executed by the controller to effect the modification. In the case where the instruction being executed by the data processor is to be index based, the contents of a specified address location in the store is added to the instruction address field of the instruction (bits 0–9). Address locations 4, 5 and 6 of the MPROM, as shown in FIG. 7B, contain microprogram words for controlling the index base modification of the address field in an instruction word. Address location 4 of the MPROM contains a branch control word having the format as shown in FIG. 3A. This control word, now being read from the MPROM, contains specified data which is fed to the bit test logic, wherein a test is made to determine whether the address field of the instruction word is to be index based. This test is determined as shown in a decision block, which asks the question, "Is the instruction to be based?". During the execution of a branch control word, bits 8–11 and bits 14 and 15 from the output of the MPROM are decoded in the bit test logic.

Reference is now made to FIG. 6, which shows coding of the bit test field of FIG. 3A for a number of different tests which can be performed by the execution of branch control words. The present test is shown as test no. 4 in a test no. column. This test shows the binary bit configuration of bits 8–11, wherein a mneumonic column, XB specifies the question to be asked by the branch instruction. A description of the term XB is shown in the description column of FIG. 6. It will be recalled that the operation code portion (bits A-F of FIG. 2) of the instruction extracted from the store is now contained in the op. register 24*b*. These bits are transferred via a plurality of lines 50 to the input of the bit test logic 22*b*. The bit test logic makes a determination as to whether the instruction is to be index based by comparing the states of bits 8–11 from the MPROM, with the state of bit B of the instruction word from the op. register. If bit B is a binary 1, it is indicative that the instruction address field is to be index base modified. When the comparison is made, if the condition is true, the microprogram exits from the YES branch of the based ? decision block while the bit test logic provides a count signal to the MPCNT causing the latter to increment to a count of 5. The MPCNT thus generates an address to location 5 in the MPROM.

An I/O control word is contained in location 5 which causes the control multiplexer to generate control signals to the processing unit to cause an index base address number to be fetched from the store to the K-register. This operation is effected by referring to FIG. 3C wherein bits 14 and 15 are decoded by the control multiplexer in a manner as previously described. Bits 13 and 11 are both binary 0's. Since the operation is to be a read from store, bits 9 and 10 are decoded by the control multiplexer to generate a read signal to the data processing unit to effect the read operation. Bit 8 is a binary 0 since it is not desirable at this time to defer the data destination control to the MDROM. As indicated in FIg. 7B, the index base address number is read to the K-register. As a result, bits 6 and 7 are decoded by the control multiplexer to generate an output signal to the processing unit to direct the base address information to the K-register.

Since the location of the index base number in store is unique to the instruction being executed, the store address register source is deferred to the MDROM instruction control word as specified in bits 10–15 (index location control). The store address, as specified in bits 10–15is sent by the multiplexer to the processing unit as a result of the coding of bits 0–5 of the I/O control word (FIG. 3C) in location 5 of the MPROM. This deferring of the store address register source is indicated by the symbol @ in the location 5 operation block.

The instruction control word presently being read from the MDROM is being retrieved from a location specified by the operation code information in the op. register 24*b*. Thus, the contents of the instruction control word are unique to the instruction being executed by the data processor. The generation of. the control and address signals from the control multiplexer will effect the reading of the store location containing the index base number into the K-register. Also, at this time, bits 14, 15 and 11 of the I/O control word are decoded by the bit test logic which generates a count signal to the MPCNT causing the latter to step to a count of 6.

The MPROM, now being addressed to location 6, contains a procedure control word (FIG. 3B). The procedure control word is used in this step of the microprogram to add the contents of the IAR and K-register and place the results of the addition back into the IAR. In this manner, the index base address number is added to the instruction address field to address modify the latter. The contents of the procedure control word are now being provided to the control multiplexer via lines 36 and 38. To effect the addition of the IAR and K-register, bits 8–10 of the ALU function select field are decoded by the multiplexer which provides enable signals to the ALU to allow the IAR and K-register to be transferred therethrough. Also, bit 7 is set to a binary 1 state whereby the control multiplexer generates an ISO output signal to enable the IAR to receive the contents from the ALU subsequent to the addition. As previously explained, the operation code, bits 14 and 15, are also provided to the control multiplexer. Further, it is desirable to increment the MPCNT. As such, bit 11 is set to a binary 0. This results in the bit test logic again generating a count pulse to the MPCNT counting it up to 7.

Reference is now made back to address location 4 to the based ? decision block. Let it now be assumed that the instruction word contained in the op. register is not to be index based. Under this condition, bit B (IB) of the instruction word will be a binary 0. As a result, when the branch test is performed by the bit test logic, the microprogram controller exits through the NO branch of the based ? decision block and enters into the input of an indexed ? decision block at address location 7 of the MPROM. In order to perform this branch, it is necessary to apply a branch address to the input of the MPROM from the MPCNT. This is accomplished by referring, in FIG. 3A, to bit 6. Bit 6 is identified as the defer branch address to MDROM. As shwon in FIG. 5, bit 6 is applied from the MPROM, via lines 42, to the input of the MPUX 22*c*. The state of bit 6 is utilized by the MPUX to determine whether the address to be parallel loaded into the MPCNT from the MPUX is to come from the MDROM or the MPROM. In the present instance, since the address for the MPROM is to come from the output of the MPROM itself, bit 6 will be a binary 0. In the present discussion, since the instruction is not to be index based, the bit test logic generates a parallel load signal to the input of the MPCNT on one of the lines 52. This parallel load signal effects the transfer of bits 0–5 (FIG. 3A), the branch address to self field, of the MPROM into the MPCNT via the MPUX. Thus, the MPCNT is loaded with the location 7 address now being provided to the MPROM on address lines 60.

Location 7 in the MPROM contains a branch control word similar to that just described for address location 4. The coding of the branch control word in location 7 is the same as that described for location 4, with the exception that the bit test field (bits 8–11) as shown in FIG. 6, are coded with a test No. 6 (XA) asking the question, "Is the instruction word to be indexed?". That is, is an index word from store to be added to the instruction address field? This is accomplished in the bit test logic wherein the state of bit A (IA) of the basic instruction word (FIG. 2) is compared with XA. If bit A is a binary one, the microprogram will exit through the YES branch of the indexed ? decision block, while simultaneously the bit test logic provides a signal to the MPCNT causing the latter to address location 8 of the MPROM.

Location 8 contains an I/O control word like that previously described for address location 5. The execution of the control word in location 8 is the same as described for location 5, except that bits 10–15 of the MDROM instruction control word specify the address of a store location containing an index number which is to be added to the instruction word address field.

After execution of the control word in location 8, the MPCNT is incremented to generate an address to location 9 of the MPROM. Location 9 of the MPROM contains a procedure control word having the same format as described for address location 6. The operations performed during the execution of the control word in location 9 are the same as previously described in connection with location 6. However, during the execution of the procedure control word, the contents of the addressed index location are added to the instruction word address field.

Figure 7C:
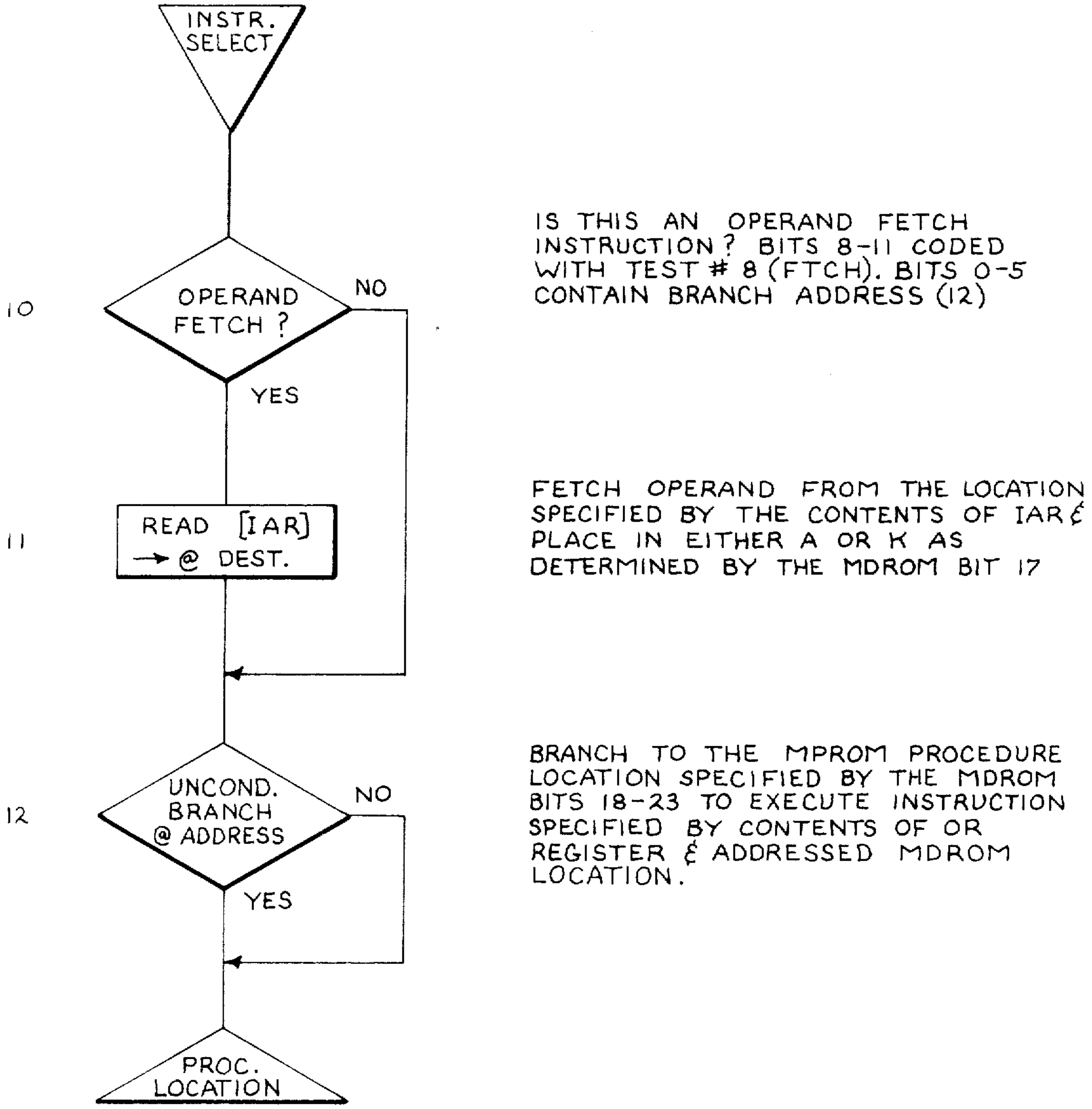

Referring back to the indexed ? decision block of location 7, the operation performed therein are also the same as described for location 4 where the microprogram exits through the NO branch of the indexed ? decision block. The only difference is that the branch address provided by bits 0–5 in location 7, address location 10 of the MPROM. Upon completion of the microprogram step of location 9, the bit test logic generates a count pulse to the MPCNT, causing the latter to apply this latter address to the MPROM. This addressing of location 10 is shown in FIGS. 7B and 7C, wherein the microprogram exits from either location 7 or 9 into an instruction select block (instr. select), and enters into location 10 to an operand fetch ? decision block.

Now that the effective address of the instruction word has been calculated, a determination is made as to whether the particular instruction being executed requires the fetching of an operand from the store. This determination is made in location 10 which contains a branch control word (FIG. 3A). Again, bits 14, 15 and 8–11 from the MPROM are provided to the bit test logic via lines 54. The operation code portion of the basic instruction word, (FIG. 2) are still provided as inputs to the bit test logic on lines 50. Bits 8–11 of the bit test field are coded to perform test No. 8 (FTCH) as shown in FIG. 6 and combined in the bit test logic with the operation code portion of the instruction word (bits A-F) to make a determination as to whether the instruction requires an operand fetch.

If the instruction being executed does not require an operand fetch, the microprogram will exit from the NO branch of the operand fetch ? decision block, and enter into an unconditional branch@address decision block at address location 12. This branch adddress is effected as specified by the contents of bits 0–5 of the branch control word in location 10. Since it is undesirable at this time to defer the branch address control to the MDROM, bit 6 of the branch control word is a binary 0. It is this binary 0 state of bit 6, which is applied to the input of the MPUX via lines 42, that effects the transfer of the branch address from the MPROM through the MPUX into the MPCNT. The MPCNT is loaded with the address location number 12 by a parallel load signal generated by the bit test logic.

Referring now back to the operand fetch ? decision block, if the instruction requires an operand fetch, the microprogram will exit through the YES branch to address location 11. This location of the MPROM contains an I/O control word which effects the fetching of the operand from a location in store specified by the contents of the IAR and places the operand data or word in either the A or the K-register as determined by the state of bit 17 of the MDROM instruction control word.

As previously mentioned, the MDROM contains, in each of its addressable storage locations, an instruction control word having the format as shown in FIG. 4. The control words in the MDROM each have a unique direct correspondence or relationship to the operation code information in the op. register, the contents of the latter being utilized to address specified locations in the MDROM.

The MPROM, now being addressed at location 11 from the MPCNT, is providing signals to the control multiplexer. The control multiplexer decoding bits 14 and 15 of the I/O control word in conjunction with bits 9 and 10, cause the data processing unit to perform a read function. Of significance, during the execution of this I/O control word, is the state of bit 8, which is presently set to a binary 1, indicating that control of the destination of the data coming from the store into the data processing unit is to be deferred (@) to the MDROM instruction control word.

Reference is now made to FIG. 4 to bit 17 (data destination). The state of bit 17 (a binary 1 or 0), will determine the destination of the operand to be read from store into the data processing unit. For example, if bit 17 is a binary 1, the operand will be channeled into the A-register. Whereas, if bit 17 is a binary 0, the operand will be transferred into the K-register. The destination for this data is determined by the specific instruction being executed by the data processing unit. That is, the op. register 24*b* will be addressing a location in the MDROM containing an instruction control word which specifies the operand destination. Again, bits 14, 15 and 11 from the MPROM will be decoded by the bit test logic, which generates a count output signal to the MPCNT, causing the latter to address location 12, as shown in FIG. 7C.

An unconditional branch control word is contained in location 12 which is coded so that a branch address to the MPROM is deferred to the MDROM instruction control word bits 18–23 (FIG. 4). FIG. 6 shows the coding of bits 8–11 for the unconditional branch (UB) as test No. 15. The bit test logic, in rewponse to this coding, generates a parallel load signal to the input of the MPCNT to allow the address from the MPUX to be parallel transferred into the latter. Also, bit 6 of the branch control word (FIG. 3A) is applied as a binary 1 signal to the input of the MPUX from the output of the MPROM. The binary 1 state of bit 6 enables the transfer of the branch address (bits 18–23) from the MDROM (FIG. 4) into the MPUX via lines 30. The MPROM is now being addressed at a specified location containing a control word in the microprogram for beginning the execution of a microprogram subroutine for controlling the execution of the instruction presently in the op. register 24b.

Figure 8:
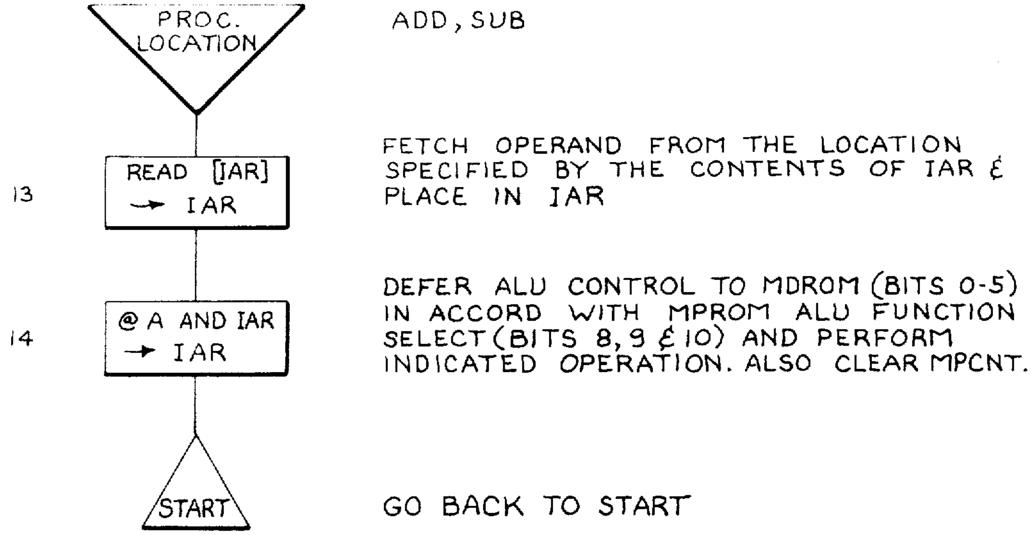

It will be noted in FIG. 7C that the microprogram exits from the unconditional branch@address decision block at location 12 to a procedure location (proc. location) block. A procedure location can be any address location in the MPROM. The procedure location is directly dependant upon the address specified by bits 18–23 of the unique MDROM control word. This location will be a location in the microprogram wherein a control word is contained which relates to a particular instruction to be executed by the data processor. For example, if the instruction to be executed is an add or a subtract instruction, the address location loaded into the MPCNT from the MPROM will be to location 13, as shown in FIG. 8. FIG. 8 illustrates, in flow diagram form, the execution of the various control words contained in the MPROM and the MDROM for the execution of the microprogram subroutine to control the data processing unit through its manipulations in executing either an add or subtract instruction.

The first microprogram control word of the subroutine (contained in location 13) is an I/O control word (FIG. 3C). In this particular microprogram step, the location specified by the contents of the IAR are read from the specified location in store into the IAR. Bits 14 and 15 are decoded by the control multiplexer as an I/O control word and bits 9 and 10 select the I/O function to be a read of data from the store. Bits 6 and 7 are decoded by the multiplexer, which directs the processing unit to place the data read from the store in the IAR. Also, bits 0–5 are decoded by the multiplexer, wherein bits 3–5 specify that the store address is to come from the contents of the IAR. Further, bits 8 and 11 are binary 0's. Again, as previously described, bits 14, 15 and 11 from the MPROM are decoded by the bit test logic which steps the MPCNT to an address location count of 14.

During the execution of either the add or subtract command, internal operations must be performed by the ALU in the data processing unit. As a result, a procedure control word (FIG. 3B) is contained in location 14 of the MPROM. This procedure control word will defer control of the ALU from the MPROM microprogram to an MDROM instruction control word related to the instruction being executed by the data procesor. Further, the contents of the procedure control word will enable the multiplexer to output signals for controlling the various registers in the data processing unit.

Reference is now made to the control multiplexer 26 of FIG. 5 and to the procedure control word of FIG. 3B. Bits 14 and 15 of the procedure control word are provided to the control multiplexer along with the ALU function select field bits 8, 9 and 10. The decoding of bits 8–10 by the control multiplexer will cause the latter to defer control of the ALU from the procedure control word to bits 0–5 of the MDROM instruction control word (FIG. 4). The contents of bits 0–5 will cause the multiplexer to provide the proper control signals to the ALU to enable the contents of the IAR and the A-register to be transferred through the ALU, and either added or subtracted in accordance with the functions specified by bits 0–5. Further, since the results of the addition or subtraction are placed in the IAR, bit 7 of the procedure control word is a binary 1 causing the multiplexer to generate a control signal ISO to parallel load the contents of the ALU into the IAR. Upon completion of this microprogram step, the MPCNT is cleared by the bit test logic which decodes bits 14, 15 and 11 from the MPROM. Since bit 11 of this procedure control word is a binary 1, the bit test logic generates a clear or reset output signal to the MPCNT causing the latter to reset to a binary 0 state. The microprogram controller now exits from address location 14 back to the start block of FIG. 7A, wherein the process of executing the microprogram is repeated as previously described.

Reference is now made to FIG. 9, which shows a flow chart execution diagram of the microprogram controller for controlling the execution of an SRC (shift A-register right circular) instruction to be executed by the data processor. Let it now be assumed that the operation code portion of the SRC instruction is presently in the op. register. The contents of the op. register are now addressing a location in the MDROM related to this particular instruction. It will be recalled, by referring back to FIG. 7C, that during the execution of the unconditional branch instruction control word in the MPROM location 12, the branch address was deferred to the MDROM. Since the SRC instruction is presently being executed, that address in bits 0–5 of the MDROM instruction control word are addressing location 15 of FIG. 9. Further, it will be recalled from the previous discussion of FIG. 2, that bits 0–9 of the basic instruction word may also contain a function code or number in binary coded form specifying a number of shifts to be performed during a shift instruction. In addition, it will be recalled that the operand address or function field of the instruction is always loaded into the IAR. During the execution of the microprogram instruction in address location 15, the number of shifts to be performed are transferred from the IAR into the K-register. This transfer is controlled by a procedure control word which is read out of the MPROM. Op. code bits 14 and 15 (FIG. 3B) are decoded by the multiplexer in conjunction with bits 8–10 of the ALU function select field causing the multiplexer to generate a control signal to effect the gating of the IAR to the ALU. Further, bit 5 (KPE) of the procedure control is a binary 1. A signal KPE is passed by the control multiplexer to enable the K-register to be parallel loaded from the ALU, thus shifting or transferring the number of shifts from the IAR to the K-register. Again, the bit test logic will decode bits 14, 15 and 11 of the procedure control word and generate a count signal to the MPCNT causing the latter to address location 16 of the MPROM.

In microprogram step 16, it is desirable to decrement the K-register by one. This is accomplished by another procedure control word wherein bits 14 and 15 are again decoded by the control multiplexer, along with bit 4 (KCE, K count enable), which is a binary 1. KCE is passed as a signal by the multiplexer to the K-register enabling the latter to be decremented by a count of one. The bit test logic also provides a count signal to the MPCNT stepping the MPROM address to location 17.

Location 17 contains a microprogram branch control word which effects a test to see if the K-register is equal to 0 (K = 0). That is, have the number of shifts of the A-register been completed? This test is performed in the bit test logic wherein bits 8–11 of the bit test field (FIG. 6), are set up to perform test No. 13 (SRC, shift right complete ?). The status of the K-register is provided to the bit test logic on lines 40 from the processing unit. If this status, when compared to bits 8–10, does not indicate that the K-register is equal to 0, the bit test logic generates another count signal. This count signal causes the MPCNT to address location 18 of the MPROM. A procedure control word is also contained in location 18. Of significance in the procedure control word in location 18, is the state of bit 3. Bit 3 is a binary 1 and is passed by the multiplexer as a signal AS1 to the input of suitable gating logic of the A-register enabling the latter to shift right one position. Again, the bit test logic, by observation of bits 14, 15 and 11, generates a count signal causing the MPCNT to count up to an address location 19, as shown to the left of an unconditional branch decision block in FIG. 9.

Location 19 contains a branch control word having a branch address to location 16 in bits 0–5 and bits 8–11 coded to perform test No. 15 (FIG. 6) as previously explained. Bit 6 of the branch control word (FIG. 3A) is a binary 0 so that the MPUX will pass the branch address from the MPROM to the MPCNT. In response to the decoding of bits 14, 15 and 8–11, the bit test logic genertes a parallel load signal to the MPCNT allowing the branch address to be loaded into the MPCNT. As a result, the microprogram branches back to address location 16 reentering into the K–1 block.

The microprogram controller will continue cycling in a loop through steps 16–19 until the K-register is equal to 0. When K = 0, the A-register will have been shifted to the right the prescribed number of times and the branch control word in location 17 is executed, causing the microprogram to exit the YES branch and return to the start block as shown in FIG. 7A. This branching to the start of the microprogram is effected by having a binary 0 address in bits 0–5 of the branch control word of location 17. With K = 0 and bits 8–11 coded to perform the unconditional branch (UB), the bit test logic applies a parallel load signal to the MPCNT. This results in a parallel transfer of bits 0–5 from the MPROM into the MPCNT via the MPUX. Bit 6 of the branch control word is a binary 0 thus directing the branch address from the MPROM into the MPUX.

Figure 11:
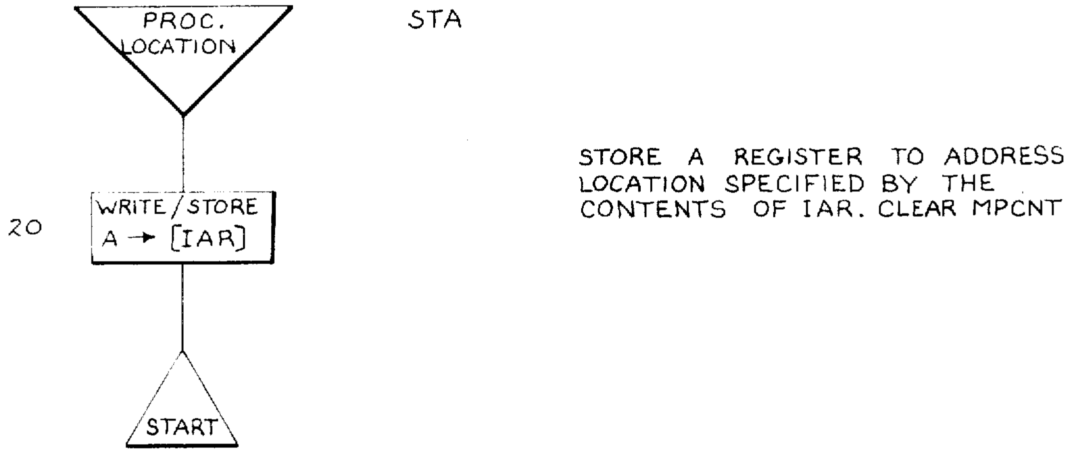

Reference is now made to FIG. 11 which shows a STA (Store A-register) instruction flow chart, wherein location 20 of the MPROM is being addressed from the MPCNT when the microprogram exits location 12 as previously described in connection with FIG. 7C. For controlling the ececution of the STA instruction, an I/O control word is placed in location 20 of the MPROM. This instruction effects the storing of the contents of the A-register in the data processing unit into a store location specified by the contents of the IAR. Referring to FIG. 3C, the I/O op. code (bits 14 and 15) are again decoded by the control multiplexer in conjunction with the I/O function select field bits 9 and 10 to effect the generation of a write control signal to the data processing unit. Further, since it is desirable to store the A-register in the store location specified by the IAR, bits 6 and 7 are appropriately coded and used by the multiplexer to enable a transfer of the A-register to the store. Since the source of the store address register is the IAR, bits 0–5 are decoded by the control multiplexer to enable the IAR to address the store. The MPCNT is also cleared during the execution of this microprogram control word by the bit test logic generating the clear output signal to the MPCNT, causing the microprogram to return to the start block of FIG. 7A.

In FIG. 10 another type of branch instruction, BST (branch on status condition), is shown which may be executed by the microprogram controller. Let it be assumed that the BST instruction is in the op. register. A branch control word is contained in location 21 and is utilized to test some designated condition being provided to the bit test logic from the data processing unit via lines 40. This test is performed by referring to FIG. 6, wherein test No. 11 (BST) shows the coding of bits 8–11 of the bit test field. The question being asked by this branch control word is indicated in a BST = 1 ? decision block in FIG. 10. Assuming that BST is not equal to one, the microprogram will exit through the NO branch and return to the start block of FIG. 7A. This is accomplished by having binary 0's in bits 0–5 and a binary 0 in bit 6. As previously explained, bit 6 directs the MPROM address on lines 44 through the MPUX and the bit test logic generates a parallel load signal to the MPCNT in response to bits 14, 15 and 8–11.

Referring back to location 21, if BST = 1, the microprogram will exit through the YES branch, at which time the bit test logic generates a count signal incrementing the MPCNT to a count of 22. Location 22 of the MPROM contains an I/O control word which effects the storing of the contents of the IAR to the P-register in store, to a location specified by bits 0–5. Also, bits 9 and 10 of the I/O function select field, via the control multiplexer, control the data processing unit to perform a write operation to the store. Further, bits 6 and 7 are decoded by the control multiplexer to define to the processing unit the data source of the information going into store. That is, the IAR. In this particular I/O control word, bit 11 (clear MPCNT) in a binary 1. Thus, the bit test logic generates a clear output signal to the MPCNT resetting the latter and causing the microprogram controller to return to the start block of FIG. 7A.

In FIG. 6 it will be noted that a number of the test nos. are illustrated as not used. These tests may be utilized by the bit test logic to effect a branch operation of the microprogram in response to many different status conditions provided by the processing unit.

Though the invention has been explained wherein specified functions are generated by the microprogram controller for a general purpose data processor, it will be immediately obvious to those of ordinary skill in the art that many modifications of the formats and the contents of the control words can be developed to provide a controller for controlling any number of different types of data processors, digital controllers or similarly constructed external devices.

The coordination of the operations between the data processing unit and the microprogram controller can be either synchronous or asynchronous. It is well-known by those familiar with the art that these operations are merely timing functions which can be accomplished by standard design techniques. It is for this reason that timing has not been stressed in describing the illustrative embodiment.

While the principles of the invention have now been made clear in an illustrative embodiment, there will be immediately obvious to those skilled in the art, many modifications of structure, arrangement, proportions, the elements, materials, and components, used in the practice of the invention, and otherwise, which are particularly adapted for specific environments and operating requirements without departing from those principles. The appended claims are, therefore, indented to cover and embrace any such modifications, within the limits only of the true spirit and scope of the invention.

What is claimed is:

1. A microprogram controller for controlling the execution of an instruction by a programmable data processor in response to operation code information contained in an instruction provided to said controller from said processor, comprising:

a. a first addressable memory for storing first and second types of microprogram instructions, each of said types containing control data, said first type further containing address information, and said second type further containing data processor control information;

b. a second addressable memory for storing control words, each unique to an instruction to be executed by said data processor, said control words containing address information and data processor control information, said second memory being in communication with said data processor and addressable therefrom in response to the operation code information to effect the retrieval of a control word from said second memory;

c. control means for selectively providing addressing signals to said first memory to retrieve a microprogram instruction therefrom, said control means including, 1. testing means responsive to the operation code information provided by said data processor and to the control data contained within a previously retrieved one of said first and second types of microprogram instructions for generating address control signals to be utilized in a subsequent accessing of said first memory, 2. address transfer means including an indexable counter, said transfer means being in communication with said first and second memories and receiving the addrsss information contained in a control word previously retrieved from said second memory and that address information and control data contained in the one of said first and second types of microprogram instructions previously retrieved from said first memory, said address transfer means, in a first instance, being selectively responsive to said address control signals and to said control data contained in a previously retrieved first type of microprogram instruction to select and transfer said address information contained in said previously retrieved first type of microprogram instruction and said previously retrieved control word to said memory as said addressing signals, and in a second instance, stepping said indexable counter and transferring an address therefrom as said addressing signals to said first memory in response to control data applied to said testing means and contained in a previously retrieved second type of microprogram instruction; and d. means in communication with said first and second memories for selectively providing control signals for controlling said data processor in accordance with the data processor control information contained in said previously retrieved control word and the data processor control information and control data contained in a previously retrieved second type of microprogram instruction.

2. In a programmable data processor the combination comprising:

a. a data processing unit including an addressable store for retaining instructions to be executed by said data processing unit, the instructions having at least an operation code portion defining the instructions;

b. a microprogram controller in communication with said data processing unit for controlling the execution of instructions in said processing unit, said microprogram controller comprising, 1. a first addressable memory for storing first and second types of microprogram instructions collectively comprising a microprogram to be executed, each of said types including control data, said first type further containing address information, and said second type further containing data processing unit control information, 2. a second addressable memory for storing control words, each unique to an instruction to be executed by said data processor, said control words containing address information and data processing unit control information, said second memory being in communication with said data processing unit and addressable therefrom in response to said operation code portion to effect the retrieval of a control word from said second memory, 3. control means for selectively providing addressing signals to said first memory to retrieve a microprogram instruction therefrom, said control means including, test logic responsive to the operation code portion of an instruction from said data processing unit and to the control data contained within a previously retrieved one of said first and second types of microprogram instructions for generating address control signals to be utilized in a subsequent accessing of said first memory, an address transfer means including a serial parallel counter for providing said addressing signals to said first memory, said transfer means being in communication with said first and second memories and receiving the address information contained in a control word previously retrieved from said second memory and that address information and control data contained in the one of said first and second types of microprogram instructions previously retrieved from said first memory, said address transfer means, in a first instance, being selectively responsive to said address control signals and to said control data contained in a previously retrieved first type of microprogram instruction to select and transfer said address information into said serial parallel counter to provide said address signals to said memory in accordance with the address information contained in said previously retrieved first type of microprogram instruction and said previously retrieved control word, and in a second instance, stepping said serial parallel counter and transferring an address therefrom as said addressing signals to said first memory in response to control data applied to said test logic and contained in a previously retrieved second type of microprogram instruction, and 4. means in communication with said first and second memories for selectively providing control signals for controlling said data processing unit in the execution of an instruction in accordance with the data processor control information contained in said previously retrieved control word and the data processor control information and control data contained in a previously retrieved second type of microprogram instruction.

3. A microprogram controller for providing control signals for controlling a data processor in the execution of instructions, the instructions each containing at least an operation code portion defining the instructions, said microprogram controller comprising:

a. a first addressable memory for storing first and second types of microprogram instructions, each of said types containing control data, said first type further containing address information, and said second type further containing data processor control information, said microprogram instructions being grouped into subroutines forming a microprogram;

b. a second addressable memory for storing control words, each unique to an instruction to be executed by said data processor, said control words containing address information and data processor control information, said second memory being in communication with said data processor and addressable therefrom in response to the operation code portion to effect the retrieval of a control word from said second memory;

c. testing means responsive to the operation code portion of an instruction provided by said data processor and to the control data contained within a previously retrieved one of said first and second types of microprogram instructions for generating address control signals to be utilized in a subsequent accessing of said first memory;

d. address transfer means, including an indexable counter, for selectively providing addressing signals to said first memory, said transfer means being in communication with said first and second memories and receiving the address information contained in a control word previously retrieved from said second memory and that address information and control data contained in the one of said first and second types of microprogram instructions previously retrieved from said second memory, said address transfer means, in a first instance, being selectively responsive to said address control signals and to said control data contained in a previously retrieved first type of microprogram instruction to select and transfer said address information contained in said previously retrieved first type of microprogram instruction and said previously retrieved control word to said memory as said addressing signals, to access a subroutine, and in a second instance stepping said indexable counter and transferring an address therefrom as said addressing signals to said first memory in response to control data applied to said testing means and contained in a previously retrieved second type of microprogram instruction to continue the execution of a subroutine presently being executed; and e. means in communication with said first and second memories for selectively providing control signals for controlling said data processor in accordance with the data processor control information contained in said previously retrieved control word and the data processor control information and control data contained in a previously retrieved second type of microprogram instruction.

4. A microprogram controller as recited in claim 3 wherein said second memory includes a register for receiving the operation code portion of an instruction from said data processor for addressing said second memory.

5. In a data processing system of the type including a programmable data processor, the combination comprising:

a. a processing unit, including an addressable store, for executing instructions retrieved from said store in accordance with control signals applied to said processing unit, the instructions each having at least an operation code portion to be utilized as an address;

b. a first read only memory for storing first and second types of microprogram instructions, each of said types containing control data, said first type further containing address information, and said second type further containing processing unit control information;

c. a second read only memory for storing control words, each unique to an instruction to be executed by said processing unit, said control words containing address information and processing unit control information;

d. a register in communication with said processing unit and said second read only memory for receiving the operation code portions of an instruction to be executed by said processing unit and addressing said second read only memory to retrieve a control word therefrom;

e. a serial parallel counter for providing addressing signals to said first read only memory to retrieve a microprogram instruction from said first read only memory in response to address control signals applied thereto;

f. testing means responsive to the operation code portion of an instruction to be executed by said processing unit and to the control data contained in a previously retrieved one of said first and second types of microprogram instructions for providing said address control signals to said serial parallel counter to be used in a subsequent accessing of said first read only memory;

g. a multiplexer in communication with said serial parallel counter and with said first and second read only memories and receiving the address information contained in a control word previously retrieved from said second memory and that address information and control data contained in the one of said first and second types of microprogram instructions previously retrieved from said first read only memory, in a first instance, said serial parallel counter being selectively responsive to said address control signals and said multiplexer being selectively responsive to said control data contained in a previously retrieved first type of microprogram instruction to select and transfer said address information contained in said previously retrieved first type of microprogram instruction and said previously retrieved control word in parallel through said serial parallel counter as said addressing signals to said first read only memory, and in a second instance, stepping said serial parallel counter and transferring an address therefrom as said addressing signals to said first memory in response to control data applied to said testing means and contained in a previously retrieved second type of microprogram instruction; and h. means in communication with said first and second read only memories for selectively providing said control signals to said processing unit for controlling said processing unit in accordance with the data processor control information contained in said previously retrieved control word and the data processor control information and control data contained in a previously retrieved second type of microprogram instruction.

6. A microprogram controller for controlling operations in an external device, comprising:

a. a first addressable memory for storing first and second types of microprogram instructions, each of said types containing control data, said first type further containing address information, and said second type further containing external device control information;

b. a second addressable memory for storing control words, each unique to operations to be controlled in said external device, said second memory being addressable from said external device in accordance with coded information specifying an operation to be performed by said external device to effect the retrieval of a control word from said second memory;

c. test logic responsive to the coded information from said external device and to the control data contained within a previously retrieved one of said first and second types of microprogram instructions for generating address control signals to be utilized in a subsequent accessing of said first memory;

d. a serial parallel counter for providing addressing signals to said first memory to retrieve a microprogram instruction from said first memory in response to said address control signals from said test logic;

e. transfer means in communication with said serial parallel counter and with said first and second memories and receiving the address information contained in a control word previously retrieved from said second memory and that address information and control data contained in the one of said first and second types of microprogram instructions previously retrieved from said first memory, in a first instance, said serial parallel counter being selectively responsive to said address control signals and said transfer means being selectively responsive to said control data contained in a previously retrieved first type of microprogram instruction to select and transfer said address information contained in said previously retrieved first type of microprogram instruction and said previously retrieved control word in parallel through said serial parallel counter as said addressing signals to said first memory, and in a second instance, incrementing said serial parallel counter by one to sequentially address said first memory, said address control signals in said second instance being generated in accordance with the control data contained in a previously retrieved second type of microprogram instruction and applied to said test logic; and, f. multiplexer means in communication with said first and second memories for selectively providing control signals for controlling operations in said external device in accordance with the external device control information contained in said previously retrieved control word and the external device control information and control data contained in a previously retrieved second type of microprogram instruction.

7. A microprogram controller for controlling the execution of an instruction by a programmable data processor in response to status conditions generated by said data processor and to an operation code portion contained in an instruction to be executed by said processor, said microprogram controller comprising:

a. a first addressable memory for storing first and second types of microprogram instructions, said first type serving as a branch instruction containing an instruction identification field, a bit test field, a defer branch field and a branch address field and said second type serving as a control word containing an instruction identification field, a branch address field, and at least one field containing data processor control information;

b. a second addressable memory for storing micro-decode words, each unique to an instruction to be executed by said data processor, said micro-decode words containing a branch address field and at least one field containing data processor control information, said second memory being in communication with said data processor and addressable therefrom in response to the operation code portion to effect the retrieval of a micro-decode word from said second memory;

c. control means for selectively providing addressing signals to said first memory to retrieve a microprogram instruction therefrom, said control means including, 1. testing means, in a first instance, responsive to the operation code portion of an instruction, a status condition generated by said data processor and to the contents of said identification and bit test field of a first type of microprogram instruction previously retrieved from said first memory for generating a first address control signal, and in a second instance, responsive to the operation code portion of an instruction and the identification field of a second type of microprogram instruction previously retrieved from said first memory for selectively generating a second address control signal, said address control signals to be utilized in a subsequent accessing of said first memory, 2. address transfer means including an indexable counter, said transfer means being in communication with said first and second memories and receiving an address contained in the branch address field of a micro-decode word previously retrieved from said second memory, and the address and data contained in the address and defer branch fields of a second type of microprogram instruction when previously retrieved from said first memory, said address transfer means, in said first instance being selectively responsive to said first address control signal and to the data contained in the defer branch field in a previously retrieved first type of microprogram instruction to select and transfer a branch address from one of the branch address fields of the previously retrieved first type of microprogram instruction and micro-decode word to said first memory as said addressing signals, and in a second instance, responsive to said second address control signal to step said indexable counter and transfer an address therefrom, as said addressing signals to said first memory; and d. means in communication with said first and second memories for selectively providing control signals for controlling said data processor in the execution of an instruction in accordance with data contained in the identification and data processor information fields of a previously retrieved second microprogram instruction and the data contained in a previously retrieved micro-decode word.

* * * * *